United States Patent
Hanawa et al.

(10) Patent No.: US 12,410,105 B2
(45) Date of Patent: Sep. 9, 2025

(54) LAMINATION MEMBER AND GLASS COMPOSITION

(71) Applicant: AGC Inc., Tokyo (JP)

(72) Inventors: Yu Hanawa, Tokyo (JP); Shuhei Ogawa, Tokyo (JP); Seiji Inaba, Tokyo (JP)

(73) Assignee: AGC Inc., Tokyo (JP)

(*) Notice: Subject to any disclaimer, the term of this patent is extended or adjusted under 35 U.S.C. 154(b) by 244 days.

(21) Appl. No.: 18/353,977

(22) Filed: Jul. 18, 2023

(65) Prior Publication Data

US 2023/0357091 A1   Nov. 9, 2023

Related U.S. Application Data

(63) Continuation of application No. PCT/JP2022/001654, filed on Jan. 18, 2022.

(30) Foreign Application Priority Data

Jan. 20, 2021   (JP) .................. 2021-007287

(51) Int. Cl.
*B32B 7/027* (2019.01)
*B32B 7/022* (2019.01)
(Continued)

(52) U.S. Cl.
CPC ............ *C04B 37/047* (2013.01); *B32B 7/022* (2019.01); *B32B 7/027* (2019.01); *B32B 7/12* (2013.01);
(Continued)

(58) Field of Classification Search
CPC ... B32B 3/263; B32B 17/10; B32B 17/10005; B32B 17/10009; B32B 17/10018;
(Continued)

(56) References Cited

U.S. PATENT DOCUMENTS 4,710,428 A * 12/1987 Tamamizu .......... C23C 16/4581
428/408
5,290,333 A *  3/1994 Nied ................ C04B 35/62665
216/99
(Continued)

FOREIGN PATENT DOCUMENTS

CN    107270755       10/2017
JP    9-298225 A      11/1997
(Continued)

OTHER PUBLICATIONS

International Search Report issued Apr. 5, 2022 in PCT/JP2022/001654 filed on Jan. 18, 2022, 2 pages.
(Continued)

*Primary Examiner* — Megha M Gaitonde
(74) *Attorney, Agent, or Firm* — Oblon, McClelland, Maier & Neustadt, L.L.P.

(57) ABSTRACT

The present invention relates to a laminated member, including: a glass member having a linear transmittance at a wavelength of 850 nm of 80% or more; a bonding layer containing a resin and lying on the glass member; and a Si—SiC member lying on the bonding layer, in which the glass member includes predetermined amounts of $SiO_2$, $Al_2O_3$, $B_2O_3$, and $P_2O_5$, the Si—SiC member has an average linear expansion coefficient $\alpha$ at 20 to 200° C. of 2.85 to 4.00 ppm/° C., and has an average linear expansion coefficient $\beta$ at 20 to 200° C. of 1.50 to 5.00 ppm/° C., and the laminated member has an absolute value $|\alpha-\beta|$, which is a value obtained by subtracting $\beta$ from $\alpha$, of 2.00 ppm/° C. or less.

19 Claims, 1 Drawing Sheet

(51) Int. Cl.
  *B32B 7/12* (2006.01)
  *B32B 9/00* (2006.01)
  *B32B 17/06* (2006.01)
  *B32B 18/00* (2006.01)
  *C03C 3/06* (2006.01)
  *C03C 3/087* (2006.01)
  *C03C 3/091* (2006.01)
  *C03C 3/093* (2006.01)
  *C03C 3/097* (2006.01)
  *C04B 37/04* (2006.01)

(52) U.S. Cl.
  CPC .............. *B32B 9/005* (2013.01); *B32B 17/06* (2013.01); *B32B 18/00* (2013.01); *C03C 3/06* (2013.01); *C03C 3/087* (2013.01); *C03C 3/091* (2013.01); *C03C 3/093* (2013.01); *C03C 3/097* (2013.01); *B32B 2255/26* (2013.01); *B32B 2307/302* (2013.01); *B32B 2307/306* (2013.01); *B32B 2307/412* (2013.01); *B32B 2307/54* (2013.01); *B32B 2307/558* (2013.01); *B32B 2307/72* (2013.01); *B32B 2307/7376* (2023.05); *C04B 2237/365* (2013.01)

(58) Field of Classification Search
  CPC .............. B32B 17/101; B32B 17/10119; B32B 17/10174; B32B 17/1022; B32B 9/005; B32B 9/00704; B32B 9/045; B32B 27/06; B32B 27/22; B32B 27/30; B32B 27/08; B32B 27/306; B32B 2307/30; B32B 2307/302; B32B 2307/54; B32B 2307/558; B32B 2315/08; B32B 33/00; B32B 2329/06; B32B 2605/006; B32B 2605/08; C08J 5/18; C08J 2329/14; G02B 2027/012; G02B 27/01; B60J 1/001; B60J 1/02; B60K 2370/1529; Y10T 428/24479; Y10T 428/24612; Y10T 428/24942; Y10T 428/2495; Y10T 428/24959
  USPC .......................... 428/156, 172, 212, 213, 214
  See application file for complete search history.

(56) References Cited

U.S. PATENT DOCUMENTS 5,562,774 A * 10/1996 Breidenbach ....... C23C 16/4404
                                                      211/41.18
7,666,513 B2 * 2/2010 Boyle ............... H01L 21/67306
                                                      211/41.18
11,958,269 B2 * 4/2024 Ogawa .................... B32B 18/00
11,964,450 B2 * 4/2024 Ogawa .................... B32B 9/045
2004/0183232 A1 * 9/2004 Kinoshita ............... C04B 35/64
                                                      264/332
2008/0174054 A1 * 7/2008 Lipson .............. H01L 21/68757
                                                      264/605
2010/0128242 A1   5/2010 Lipson et al.
2013/0288876 A1  10/2013 Fujisawa et al.
2016/0276544 A1   9/2016 Shiratori et al.
2017/0157891 A1   6/2017 Soda et al.
2018/0082914 A1 *  3/2018 Hanawa .................. H01L 23/15
2018/0305241 A1  10/2018 Sawamura et al.
2021/0102991 A1   4/2021 Kasai et al.
2022/0134713 A1   5/2022 Ogawa et al.
2023/0103501 A1   4/2023 Yamamoto et al.
2023/0107722 A1   4/2023 Hanawa et al.

FOREIGN PATENT DOCUMENTS

| JP | 11-100229 A | 4/1999 |
| JP | 2005-86711 A | 3/2005 |
| JP | 2008-199006 A | 8/2008 |
| JP | 2012-148958 A | 8/2012 |
| JP | 2013-197425 | 9/2013 |
| JP | 2014-165459 A | 9/2014 |
| JP | 2018-203571 A | 12/2018 |
| WO | WO 2015/087812 A1 | 6/2015 |
| WO | WO 2018/100881 A1 | 6/2018 |
| WO | WO 2021/015059 A1 | 1/2021 |
| WO | WO 2021/251247 A1 | 12/2021 |

OTHER PUBLICATIONS

International Search Report issued Aug. 17, 2021 in PCT/JP2021/021106 filed Jun. 2, 2021, 3 pages.
Written Opinion issued Aug. 17, 2021 in PCT/JP2021/021106 filed Jun. 2, 2021, 4 pages.
International Search Report issued Jul. 6, 2021 in PCT/JP2021/021105 filed Jun. 2, 2021, 2 pages.
Written Opinion issued Jul. 6, 2021 in PCT/JP2021/021105 filed Jun. 2, 2021, 4 pages.

* cited by examiner

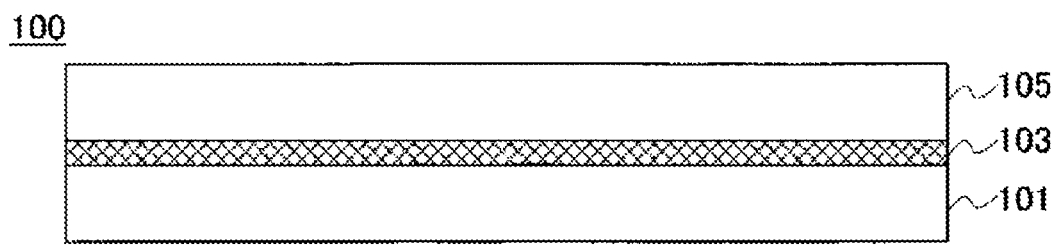

LAMINATION MEMBER AND GLASS COMPOSITION

CROSS-REFERENCE TO RELATED APPLICATIONS

This is a continuation of International Application No. PCT/JP2022/001654 filed on Jan. 18, 2022, and claims priority from Japanese Patent Application No. 2021-007287 filed on Jan. 20, 2021, and the entire contents of which are incorporated herein by reference.

TECHNICAL FIELD

The present invention relates to a laminated member and a glass composition used for a glass member constituting a laminated member.

BACKGROUND ART

In a kitchen system, a work table, heating cooking device and the like are connected by a worktop. Examples of the worktop materials include stainless steel, artificial marble, and ceramics.

In inspection apparatuses and test apparatuses for conducting electrical tests of electronic devices, glass or the like is used as a material of a placing table on which the electronic devices are placed.

The heating cooking device is incorporated into an opening provided in the worktop. The heating cooking device includes a top plate on which an object to be heated (such as a pot) is placed. Examples of materials for the top plate include crystallized glass (see Patent Literature 1) and ceramics.

Patent Literature 2 and Patent Document 3 disclose inspection apparatuses and test apparatuses for inspecting electrical characteristics of electronic devices. For example, a placing table in the inspection apparatus of Patent Literature 2 includes a stage lid made of ceramic, quartz, or glass and a cooling unit.

CITATION LIST

Patent Literature

Patent Literature 1: JP2012-148958A
Patent Literature 2: WO2018/100881A1
Patent Literature 3: JPH09-298225A

SUMMARY OF INVENTION

Technical Problem

In recent years, from the viewpoint of design, there is a demand to use the same material for a worktop and a top plate. Therefore, application of a heating member used for a top plate of a heat cooking device, an inspection apparatus, or the like to a worktop is studied.

Here, the heating member used for the top plate is required to include a structure of being capable of heating rapidly and a cooling (heat absorbing) structure for protecting a temperature sensor unit including an electronic device in order to control a temperature within a predetermined temperature range with respect to a set temperature. Therefore, the heating member is required to have excellent temperature rise property and impact resistance.

As a heating member in the related art, inventors of the present invention evaluated a laminated member including a glass member, a resin bonding layer, and a Si—SiC member, and found that although the laminated member is excellent in a temperature rise property and impact resistance, there is room for improvement in thermal shock resistance.

Accordingly, an object of the present invention is to provide a laminated member excellent in temperature rise property, impact resistance and thermal shock resistance, and a glass composition used for a glass member constituting the laminated member.

Solution To Problem

As a result of intensive studies on the above problem, the present inventors found that, in a laminated member including a glass member having a predetermined linear transmittance, a bonding layer containing resin, and a Si—SiC member, in the case where a composition of the glass member is within a predetermined range, and an average linear expansion coefficient $\alpha$ of the Si—SiC member, an average linear expansion coefficient $\beta$ of the glass member, and an absolute value of a difference between $\alpha$ and $\beta$ ($|\alpha-\beta|$) are in predetermined ranges, the laminated member is excellent in a temperature rise property, impact resistance, and thermal shock resistance, so that the present invention was completed.

That is, the present inventors found that the above problem can be solved by the following configurations.

[1] A laminated member, including:
  a glass member having a linear transmittance at a wavelength of 850 nm of 80% or more;
  a bonding layer containing a resin and lying on the glass member; and
  a Si—SiC member lying on the bonding layer, in which
  the glass member includes, as represented by mole percent based on oxides, 55.0 mol % to 85.0 mol % of $SiO_2$, 1.5 mol % to 22.0 mol % of $Al_2O_3$, 2.0 mol % to 14.0 mol % of $B_2O_3$, and 0 mol % to 5.0 mol % of $P_2O_5$,
  the glass member has a total content of the $SiO_2$, the $Al_2O_3$, the $B_2O_3$, and the $P_2O_5$ of 70.0% to 97.0% as represented by mole percent based on oxides,
  the Si—SiC member has an average linear expansion coefficient $\alpha$ at 20° C. to 200° C. of 2.85 ppm/° C. to 4.00 ppm/° C.,
  the glass member has an average linear expansion coefficient $\beta$ at 20° C. to 200° C. of 1.50 ppm/° C. to 5.00 ppm/° C., and
  the laminated member has an absolute value $|\alpha-\beta|$, which is a value obtained by subtracting the average linear expansion coefficient $\beta$ of the glass member at 20° C. to 200° C. from the average linear expansion coefficient $\alpha$ of the Si—SiC member at 20° C. to 200° C., of 2.00 ppm/° C. or less.

[2] The laminated member according to [1], in which
  the glass member includes, as represented by mole percent based on oxides, 60.0 mol % to 78.0 mol % of $SiO_2$, 8.0 mol % to 18.0 mol % of $Al_2O_3$, 2.0 mol % to 11.0 mol % of $B_2O_3$, and 0 mol % to 3.0 mol % of $P_2O_5$, and
  the glass member has the total content of the $SiO_2$, the $Al_2O_3$, the $B_2O_3$, and the $P_2O_5$ of 80.0% to 90.0% as represented by mole percent based on oxides.

[3] The laminated member according to [1] or [2], in which
the glass member has a total content of RO and ZnO of 2.0% to 25.0% as represented by mole percent based on oxides, and
the glass member has a total content of $R_2O$ of 0% to 15.0% as represented by mole percent based on oxides.

[4] The laminated member according to any one of [1] to [3], in which
the glass member has an average linear expansion coefficient β of 2.00 ppm/° C. to 3.50 ppm/° C., a Young's modulus of 40 GPa to 120 GPa, and a melting temperature of 1000° C. to 2000° C.

[5] The laminated member according to any one of [1] to [4], in which
the glass member has the content of $B_2O_3$ of 8.5 mol % or less.

[6] The laminated member according to any one of [1] to [5], in which
the glass member includes, as represented by mole percent based on oxides, 0 mol % to 13.0 mol % of $Na_2O$.

[7] The laminated member according to any one of [1] to [6], in which
the glass member includes, as represented by mole percent based on oxides, 0.0001 mol % to 0.0115 mol % of $Fe_2O_3$.

[8] The laminated member according to any one of [1] to [7], in which
the glass member has the linear transmittance at a wavelength of 850 nm of 90% or more.

[9] The laminated member according to any one of [1] to [8], in which
the glass member has a thickness of 2 mm to 40 mm, and the Si—SiC member has a thickness of 0.5 mm to 15 mm.

[10] The laminated member according to any one of [1] to [9], in which
the Si—SiC member has a thermal conductivity at 20° C. of 130 W/m·K to 300 W/m·K.

[11] The laminated member according to any one of [1] to [10], in which
the average linear expansion coefficient β of the glass member at 20° C. to 200° C. is smaller than the average linear expansion coefficient α of the Si—SiC member at 20° C. to 200° C.

[12] The laminated member according to any one of [1] to [11], in which
the Si—SiC member has a Young's modulus of 300 GPa to 420 GPa.

[13] The laminated member according to any one of [1] to [12], in which
the Si—SiC member has a metal Si content ratio of 8 mass % to 60 mass %.

[14] The laminated member according to any one of [1] to [13], in which
the resin has a heat resistance temperature of 120° C. to 420° C.

[15] The laminated member according to any one of [1] to [14], in which
the bonding layer has an average linear expansion coefficient γ at 20° C. to 200° C. of 2 ppm/° C. to 200 ppm/° C.

[16] The laminated member according to any one of [1] to [15], having a density of 2.40 g/cm³ to 2.85 g/cm³.

[17] The laminated member according to any one of [1] to [16], having an amount of warpage of 0.25 mm or less.

[18] The laminated member according to any one of [1] to [17], further including:
a second bonding layer lying on the Si—SiC member; and
a second Si—SiC member bonded to the Si—SiC member via the second bonding layer.

[19] A glass composition used for a glass member in a laminated member, the laminated member including the glass member, a bonding layer containing a resin and lying on the glass member, and a Si—SiC member lying on the bonding layer, in which
the glass composition has a linear transmittance at a wavelength of 850 nm of 80% or more,
the glass composition includes, as represented by mole percent based on oxides, 55.0 mol % to 85.0 mol % of $SiO_2$, 1.5 mol % to 22.0 mol % of $Al_2O_3$, 2.0 mol % to 14.0 mol % of $B_2O_3$, and 0 mol % to 5.0 mol % of $P_2O_5$,
the glass composition has a total content of the $SiO_2$, the $Al_2O_3$, the $B_2O_3$, and the $P_2O_5$ of 70.0% to 97.0% as represented by mole percent based on oxides,
the glass composition has an average linear expansion coefficient β at 20° C. to 200° C. of 1.50 ppm/° C. to 5.00 ppm/° C.,
the glass composition is used for a laminated member including a Si—SiC member having an average linear expansion coefficient α at 20° C. to 200° C. of 2.85 ppm/° C. to 4.00 ppm/° C., so that the laminated member has an absolute value |α−β|, which is a value obtained by subtracting the average linear expansion coefficient β of the glass member at 20° C. to 200° C. from the average linear expansion coefficient α of the Si—SiC member at 20° C. to 200° C., of 2.00 ppm/° C. or less.

[20] A glass composition including, as represented by mole percent based on oxides:
55.0 mol % to 85.0 mol % of $SiO_2$;
1.5 mol % to 22.0 mol % of $Al_2O_3$;
2.0 mol % to 14.0 mol % of $B_2O_3$; and
0 mol % to 5.0 mol % of $P_2O_5$, in which
the glass composition has a total content of the $SiO_2$, the $Al_2O_3$, the $B_2O_3$, and the $P_2O_5$ of 70.0% to 97.0% as represented by mole percent based on oxides,
has an average linear expansion coefficient β at 20° C. to 200° C. of 1.50 ppm/° C. to 5.00 ppm/° C., and
has a linear transmittance at a wavelength of 850 nm of 80% or more.

Advantageous Effects Of Invention

According to the present invention, a laminated member excellent in temperature rise property, impact resistance and thermal shock resistance, and a glass composition used for a glass member constituting the laminated member, can be provided.

BRIEF DESCRIPTION OF DRAWINGS

FIGURE is a cross-sectional view schematically illustrating a laminated member of one embodiment of the present invention.

DESCRIPTION OF EMBODIMENTS

The terms used in the present invention have the following meanings.
A numerical range represented using "to" means a range including numerical values described before and after "to" as a lower limit value and an upper limit value.

[Laminated Member]

The laminated member according to the present disclosure include a glass member having a linear transmittance at a wavelength of 850 nm of 80% or more, a bonding layer containing a resin and lying on the glass member, and a Si—SiC member lying on the bonding layer, the glass member includes, as represented by mole percent based on oxides, 55.0 mol % to 85.0 mol % of $SiO_2$, 1.5 mol % to 22.0 mol % of $Al_2O_3$, 2.0 mol % to 14.0 mol % of $B_2O_3$, and 0 mol % to 5.0 mol % of $P_2O_5$, the glass member has a total content of the $SiO_2$, the $Al_2O_3$, the $B_2O_3$, and the $P_2O_5$ of 70.0% to 97.0% as represented by mole percent based on oxides, the Si—SiC member has an average linear expansion coefficient α at 20° C. to 200° C. of 2.85 ppm/° C. to 4.00 ppm/° C., the glass member has an average linear expansion coefficient β at 20° C. to 200° C. of 1.50 ppm/° C. to 5.00 ppm/° C., and the laminated member has an absolute value |α-β|, which is a value obtained by subtracting the average linear expansion coefficient β of the glass member at 20° C. to 200° C. from the average linear expansion coefficient α of the Si—SiC member at 20° C. to 200° C., of 2.00 ppm/° C. or less.

The laminated member of the present disclosure is excellent in temperature rise property, impact resistance, and thermal shock resistance. Although details of reasons therefor are not clarified, it is presumed that the reasons are generally as follow.

That is, it is presumed that by using the glass member having the linear transmittance at the wavelength of 850 nm of 80% or more, infrared rays sufficient for heating utilization are transmitted, and a temperature of the laminated member is raised at a high speed.

It is also presumed that by including the bonding layer which contains the resin, the bonding layer functions as a cushioning material and the impact resistance is improved.

Since the average linear expansion coefficient α of the Si—SiC member, the average linear expansion coefficient β of the glass member, and the absolute value |α-β| are in the above range, a difference in an expansion coefficient from the bonding layer containing the resin is small, and thus it is presumed that a generated stress is small and the thermal shock resistance is improved.

Hereinafter, a laminated member according to one embodiment of the present invention will be described with reference to the FIGURE.

The FIGURE is a cross-sectional view schematically illustrating the laminated member of one embodiment of the present invention. A laminated member 100 includes a glass member 101, a bonding layer 103 disposed on the glass member 101, and a Si—SiC member 105 disposed on the bonding layer 103. The laminated member 100 has a laminated structure in which the glass member 101, the bonding layer 103, and the Si—SiC member 105 are laminated in this order.

[Si—SiC Member]

In one embodiment of the present invention, the Si—SiC member means a sintered member including a composite material containing silicon carbide (SiC) and silicon (Si) (metallic Si).

With respect to a total weight of the Si—SiC member, the Si—SiC member 105 is preferably a ceramic containing 40 mass % to 92 mass % of SiC and 8 mass % to 60 mass % of Si, more preferably a ceramic containing 50 mass % to 87 mass % of SiC and 13 mass % to 50 mass % of Si, further preferably a ceramic containing 55 mass % to 82 mass % of SiC and 18 mass % to 45 mass % of Si, particularly preferably a ceramic containing 60 mass % to 77 mass % of SiC and 23 mass % to 40 mass % of Si, and most preferably a ceramic containing 65 mass % to 72 mass % of SiC and 28 mass % to 35 mass % of Si.

In the case where contents of Si and SiC of the Si—SiC member 105 are in the above range, the Si—SiC member 105 achieves an excellent balance between a thermal property and a mechanical property.

A composition of the Si—SiC member 105 is not particularly limited as long as Si and SiC are contained, and may include a component derived from a sintering aid, a tiny amount of impurities (such as Fe), and the like. The sintering aid is not particularly limited, and examples thereof include BeO, $B_4C$, BN, Al, or AlN.

The thickness of the Si—SiC member 105 is preferably 0.5 mm to 15 mm. The thickness of the Si—SiC member 105 is more preferably 1.5 mm or more, further preferably 2.0 mm or more, and particularly preferably 2.5 mm or more.

The thickness of the Si—SiC member 105 is more preferably 10.0 mm or less, further preferably 7.5 mm or less, and particularly preferably 5.5 mm or less.

Since the Si—SiC member 105 is supported by the glass member 101, the thickness can be reduced. Since the thickness of the Si—SiC member 105 can be reduced, a temperature can be raised and lowered quickly.

The thickness of the Si—SiC member 105 can be measured by, for example, a caliper and a digital measure.

The average linear expansion coefficient α of the Si—SiC member 105 at 20° C. to 200° C. is 2.85 ppm/° C. to 4.00 ppm/° C. Hereinafter, the average linear expansion coefficient α of the Si—SiC member 105 at 20° C. to 200° C. is also simply referred to as an average linear expansion coefficient α.

The average linear expansion coefficient α is preferably 2.90 ppm/° C. or more, more preferably 2.95 ppm/° C. or more, and particularly preferably 3.00 ppm/° C. or more.

The average linear expansion coefficient α is preferably 3.40 ppm/° C. or less, more preferably 3.20 ppm/° C. or less, and particularly preferably 3.10 ppm/° C. or less.

In the case where the average linear expansion coefficient α of the Si—SiC member 105 is in the above range, the average linear expansion coefficient of the Si—SiC member 105 and an average linear expansion coefficient of the glass member 101 can be readily matched with each other or brought close to each other. Since thermal conductivity and strength of the Si—SiC member 105 can be increased, the impact resistance can also be increased while increasing the speed of rising the temperature.

Here, in the case where the average linear expansion coefficient α is 3.00 ppm/° C. to 3.10 ppm/° C., the Si—SiC member achieves a more excellent balance between the thermal conductivity and the strength.

The average linear expansion coefficient α can be measured by a dilatometer whose temperature range to be measured is 20° C. to 200° C., or a thermomechanical analyzer (TMA).

As a method for setting the average linear expansion coefficient α of the Si—SiC member 105 to the above range, a method for adjusting the contents of SiC and Si within the above range is exemplified.

The thermal conductivity of the Si—SiC member 105 at 20° C. is preferably from 130 W/mK to 300 W/mK.

The thermal conductivity of the Si—SiC member 105 at 20° C. is more preferably 190 W/mK or more, further preferably 210 W/mK or more, and particularly preferably 225 W/mK or more.

The thermal conductivity of the Si—SiC member 105 at 20° C. is more preferably 270 W/mK or less, further preferably 260 W/mK or less, and particularly preferably 250 W/mK or less.

In the case where the thermal conductivity of the Si—SiC member 105 at 20° C. is within the above range, the heating member can have improved heat uniformity. In the case where the thermal conductivity of the Si—SiC member 105 is in the above range, reduction in a yield due to variation in the thermal conductivity during production of the Si—SiC member 105 can be prevented, and quality of the Si—SiC member 105 can be stabilized readily.

The thermal conductivity of the Si—SiC member 105 at 20° C. can be measured by a laser flash method for example.

As a method for setting the thermal conductivity of the Si—SiC member 105 at 20° C. to the above range, a method for adjusting the contents of SiC and Si within the above range is exemplified.

The Young's modulus of the Si—SiC member 105 is preferably 300 GPa to 420 GPa. The Young's modulus of the Si—SiC member 105 is more preferably 320 GPa or more, further preferably 350 GPa or more, and particularly preferably 370 GPa or more.

The Young's modulus of the Si—SiC member 105 is more preferably 410 GPa or less, further preferably 400 GPa or less, and particularly preferably 390 GPa or less.

The thermal shock resistance increases in accordance with a decrease in the Young's modulus. The Young's modulus of the Si—SiC member 105 satisfies the above range, and thus, the thermal shock resistance is improved, which is preferable. Furthermore, the Young's modulus of the Si—SiC member 105 is lower than that of other silicon carbide ceramics, and thus, the thermal shock resistance is high, which is preferable.

The Young's modulus of the Si—SiC member 105 can be measured at 20° C. by a testing method for elastic modulus (ultrasonic pulse method:dynamic elastic modulus) defined by Japanese Industrial Standards (JIS R1602:1995).

As a method for setting the Young's modulus of the Si—SiC member 105 to the above range, a method for adjusting the contents of SiC and Si within the above range is exemplified.

Flexural strength of the Si—SiC member 105 is preferably 130 MPa to 300 MPa. The flexural strength of the Si—SiC member 105 is more preferably 200 MPa or more, further preferably 220 MPa or more, and particularly preferably 230 MPa or more.

The flexural strength of the Si—SiC member 105 is more preferably 260 MPa or less, further preferably 250 MPa or less, and particularly preferably 240 MPa or less.

In the case where the flexural strength of the Si—SiC member 105 satisfies the above range, crack of the Si—SiC member 105 as well as the laminated member 100 due to a falling object can be prevented, and the impact resistance can be improved.

The flexural strength of the Si—SiC member 105 can be measured at 20° C. by a testing method for flexural strength (4-point flexural strength) defined by Japanese Industrial Standards (JIS R1601:2008).

Vickers hardness (Hv) of the Si—SiC member 105 is preferably 20 GPa to 27 GPa.

The Vickers hardness is more preferably 21 GPa or more, further preferably 22 GPa or more, and particularly preferably 23 GPa or more.

The Vickers hardness is more preferably 26 GPa or less, further preferably 25 GPa or less, and particularly preferably 24 GPa or less.

In the case where the Vickers hardness of the Si—SiC member 105 satisfies the above range, scratch resistances of the Si—SiC member 105 as well as the laminated member 100 are improved.

The Vickers hardness of the Si—SiC member 105 can be measured at 20° C. by a Vickers hardness testing system.

[Glass Member]

Examples of the glass member 101 include soda lime glass, borosilicate glass, aluminosilicate glass, and alkali-free glass. The glass member 101 may be glass (chemically strengthened glass) that is chemically strengthened, glass (physically strengthened glass) that is physically strengthened by air cooling or the like, or glass (crystallized glass) subjected to a crystallization treatment.

A glass composition of the glass member 101 will be described below. The glass composition (a content of a target component of the glass member) in the present description is represented by mole percent (mol %) based on oxides.

The glass member 101 includes $SiO_2$. $SiO_2$ is a main component of the glass.

From the viewpoint of enhancing a weather resistance of the glass, the content of $SiO_2$ is preferably 55.0 mol % or more, more preferably 57.0 mol % or more, further preferably 60.0 mol % or more, and particularly preferably 62.0 mol % or more.

From the viewpoint of reducing a melting temperature and enhancing manufacturability of the glass, the content of $SiO_2$ is preferably 85.0 mol % or less, more preferably 83.0 mol % or less, further preferably 80.0 mol % or less, and particularly preferably 78.0 mol % or less.

The glass member 101 includes $Al_2O_3$. By including $Al_2O_3$, the weather resistance of the glass can be enhanced and the linear expansion coefficient can be lowered.

From the viewpoint of being capable of increasing the Young's modulus of the glass, the content of $Al_2O_3$ is preferably 1.5 mol % or more, more preferably 3.0 mol % or more, further preferably 5.0 mol % or more, and particularly preferably 8.0 mol % or more.

From the viewpoint of enhancing an acid resistance of the glass, the content of $Al_2O_3$ is preferably 22.0 mol % or less. From the viewpoint of preventing devitrification of the glass (being capable of lowing a devitrification temperature), preventing generation of unmelted materials of raw materials, and preventing the melting temperature of the glass from rising to improve refining property, the content of $Al_2O_3$ is more preferably 18.0 mol % or less, further preferably 17.0 mol % or less, and particularly preferably 16.0 mol % or less.

The glass member 101 includes $B_2O_3$. By including $B_2O_3$, the linear expansion coefficient of the glass can be adjusted.

From the viewpoint of reducing the linear expansion coefficient of the glass, the content of $B_2O_3$ is 2.0 mol % or more, preferably 3.5 mol % or more, and particularly preferably 5.0 mol % or more.

From the viewpoint of enhancing the weather resistance of the glass, the content of $B_2O_3$ is 14.0 mol % or less. From the viewpoint of being capable of increasing the Young's modulus of the glass, the content of $B_2O_3$ is preferably 11.0 mol % or less, more preferably 10.0 mol % or less, further preferably 8.5 mol % or less, and particularly preferably 7.5 mol % or less.

The glass member 101 may or may not include RO. RO means at least one of MgO, CaO, SrO, and BaO. A content of RO indicates a total amount of MgO, CaO, SrO, and BaO.

From the viewpoint of reducing the melting temperature of the glass to enhance solubility and controlling the linear expansion coefficient, a total content of RO and ZnO is preferably 2.0 mol % or more, more preferably 3.0 mol % or more, further preferably 4.0 mol % or more, and particularly preferably 5.0 mol % or more.

From the viewpoint of reducing the devitrification temperature to enhance manufacturability of the glass and controlling the linear expansion coefficient, the total content of RO and ZnO is preferably 25.0 mol % or less, more preferably 20.0 mol % or less, further preferably 16.0 mol % or less, and particularly preferably 15.0 mol % or less.

In order to reduce the melting temperature of the glass to enhance the solubility and control the linear expansion coefficient, MgO may be included.

A content of MgO is preferably 1.0 mol % or more, more preferably 2.0 mol % or more, further preferably 2.5 mol % or more, and particularly preferably 3.0 mol % or more.

From the viewpoint of reducing the devitrification temperature of the glass to enhance the productivity and controlling the linear expansion coefficient, the content of MgO is preferably 15.0 mol % or less, more preferably 12.0 mol % or less, further preferably 10.0 mol % or less, and particularly preferably 9.0 mol % or less.

In order to reduce the melting temperature of the glass to enhance the solubility and control the linear expansion coefficient, CaO may be included.

A content of CaO is preferably 0.5 mol % or more, and more preferably 1.0 mol % or more.

The content of CaO is preferably 10.0 mol % or less, and more preferably 8.0 mol % or less.

In order to reduce the melting temperature of the glass to enhance the solubility and control the linear expansion coefficient, SrO may be included.

A content of SrO is preferably 0 mol % or more, more preferably 0.01 mol % or more, and further preferably 0.1 mol % or more.

The content of SrO is preferably 5.0 mol % or less, more preferably 3.0 mol % or less, and further preferably 2.0 mol % or less.

In order to reduce the melting temperature of the glass to enhance productivity and control the linear expansion coefficient, BaO may be included.

A content of BaO is preferably 0 mol % or more, and more preferably 0.01 mol % or more.

The content of BaO is preferably 3.0 mol % or less, and more preferably 2.0 mol % or less.

Even if BaO is not intentionally included, BaO may be mixed as an impurity derived from raw materials such as limestone, dolomite, or strontium carbonate, or from a manufacturing step.

The glass member 101 may or may not include $R_2O$. $R_2O$ means at least one of $Li_2O$, $Na_2O$, and $K_2O$. A content of $R_2O$ indicates a total amount of $Li_2O$, $Na_2O$, and $K_2O$.

$R_2O$ is a component useful for promoting melting of glass raw materials and for adjusting the linear expansion coefficient, the melting temperature, and the like.

In order to exert the above effects well, the content of $R_2O$ is preferably 0 mol % or more, and more preferably 0.01 mol % or more.

From the viewpoint of being capable of reducing the linear expansion coefficient of the glass and reducing a stress that occurs during a temperature change, the content of $R_2O$ is preferably 15.0 mol % or less, more preferably 10.0 mol % or less, further preferably 6.0 mol % or less, and particularly preferably 5.0 mol % or less.

Note that a total content of $R_2O$ where $Li_2O$ is not included, that is, a total content of $Na_2O$ and $K_2O$ is preferably 0 mol % or more, and more preferably 0.01 mol % or more.

From the viewpoint of reducing the linear expansion coefficient, the total content of $R_2O$ where $Li_2O$ is not included, that is, the total content of $Na_2O$ and $K_2O$ is preferably 13.0 mol % or less, more preferably 10.0 mol % or less, further preferably 5.0 mol % or less, and particularly preferably 3.0 mol % or less.

$Li_2O$ is a component useful for promoting the melting of the glass raw materials and for adjusting the linear expansion coefficient, the melting temperature, and the like.

A content of $Li_2O$ is preferably 0 mol % or more, and more preferably 0.01 mol % or more.

From the viewpoint of reducing the linear expansion coefficient of the glass and reducing the stress that occurs during the temperature change, the content of $Li_2O$ is preferably 10.0 mol % or less, more preferably 7.0 mol % or less, further preferably 5.0 mol % or less, and particularly preferably 4.0 mol % or less.

$Na_2O$ is a component useful for promoting the melting of the glass raw materials and for adjusting the linear expansion coefficient, the melting temperature, and the like.

The content of $Na_2O$ is preferably 0 mol % to 13.0 mol %.

The content of $Na_2O$ is more preferably 0.01 mol % or more.

The content of $Na_2O$ is more preferably 10.0 mol % or less, further preferably 5.0 mol % or less, and particularly preferably 3.0 mol % or less.

In the case where the content of $Na_2O$ is 13.0 mol % or less, the linear expansion coefficient of the glass can be reduced, and the stress that occurs during the temperature change can be reduced.

$K_2O$ is a component useful for promoting melting of the glass raw materials and for adjusting the linear expansion coefficient, the melting temperature, and the like.

A content of $K_2O$ is preferably 0 mol % or more, and more preferably 0.01 mol % or more.

From the viewpoint of reducing the linear expansion coefficient of the glass and reducing a stress that occurs when exposed to a high temperature, the content of $K_2O$ is preferably 3.0 mol % or less, more preferably 1.0 mol % or less, and further preferably 0.1 mol % or less.

The glass member 101 may or may not include $ZrO_2$. In the case where $ZrO_2$ is included, a chemical resistance of the glass can be improved.

From the viewpoint of being capable of exerting the above effect well, a content of $ZrO_2$ is preferably 0 mol % or more, more preferably 0.01 mol % or more, and further preferably 0.1 mol % or more.

From the viewpoint of reducing the devitrification temperature of the glass and enhancing the productivity, the content of $ZrO_2$ is preferably 5.0 mol % or less, more preferably 3.0 mol % or less, and further preferably 2.0 mol % or less.

The glass member 101 may or may not include $TiO_2$. In the case where $TiO_2$ is included, the chemical resistance of the glass can be improved.

From the viewpoint of being capable of exerting the above effect well, a content of $TiO_2$ is preferably 0 mol % or more, more preferably 0.01 mol % or more, and further preferably 0.1 mol % or more.

From the viewpoint of reducing the devitrification temperature of the glass to enhance the productivity, and preventing unnecessary coloring, the content of $TiO_2$ is preferably 5.0 mol % or less, more preferably 3.0 mol % or less, and further preferably 2.0 mol % or less.

The glass member 101 may or may not include $P_2O_5$. In the case where $P_2O_5$ is included, crystallization of the glass can be prevented and the glass can be stabilized.

A content of $P_2O_5$ is 0 mol % or more. From the viewpoint of being capable of exerting the above effect well, the content of $P_2O_5$ is preferably 0.05 mol % or more, and more preferably 0.1 mol % or more.

From the viewpoint of being capable of stabilizing the glass without excessively increasing the melting temperature of the glass, and the viewpoint of preventing phase separation in the glass to enhance the transparency, the content of $P_2O_5$ is 5.0 mol % or less, preferably 4.0 mol % or less, more preferably 3.5 mol % or less, and particularly preferably 3.0 mol % or less.

The glass member 101 may or may not include $Fe_2O_3$. In the case where $Fe_2O_3$ is included, a refining property of the glass can be improved and a temperature of a bottom substrate in a melting furnace can be controlled without impairing a color of the glass. It becomes easy to adjust the linear transmittance of the glass member 101 at a wavelength of 850 nm within a range described below, and a stable product can be obtained.

From the viewpoint of being capable of exerting the above effect well, the content of $Fe_2O_3$ is preferably 0.0001 mol % or more, more preferably 0.0005 mol % or more, and further preferably 0.0010 mol % or more.

From the viewpoint of maintaining the color of the glass, the content of $Fe_2O_3$ is preferably 0.0115 mol % or less, more preferably 0.0100 mol % or less, further preferably 0.0080 mol % or less, and particularly preferably 0.0050 mol % or less.

The glass member 101 may or may not include ZnO.

A content of ZnO is preferably 0 mol % or more, more preferably 0.01 mol % or more, further preferably 0.1 mol % or more, and particularly preferably 0.5 mol % or more.

From the viewpoint of reducing the devitrification temperature to enhance the productivity of the glass, the content of ZnO is preferably 15.0 mol % or less, more preferably 12.0 mol % or less, further preferably 10.0 mol % or less, and particularly preferably 8.0 mol % or less.

The glass member 101 may include other components (for example, $TiO_2$, $Y_2O_3$, and $Gd_2O_3$) other than the above, as long as the effects of the present invention are not impaired.

A total content of the other components is preferably 10.0 mol % or less.

The glass member 101 may appropriately include sulfates, chlorides, fluorides, halides, hydroxides, $SnO_2$, $Sb_2O_3$, $As_2O_3$, and the like as a refining agent for melting the glass.

Furthermore, coloring components such as Ni, Co, Cr, Mn, V, Se, Au, Ag, and Cd may be included for color adjustment.

In a case for actively coloring, coloring components such as Fe, Ni, Co, Cr, Mn, V, Se, Au, Ag, and Cd may be included in a range of 0.0001 mol % or more.

In the case where at least one selected from the group consisting of sulfates, chlorides, fluorides, halides, hydroxides, $SnO_2$, $Sb_2O_3$, and $As_2O_3$ among the above other components is included, a total content of the above group is preferably 0.01 mol % or more, more preferably 0.02 mol % or more, and further preferably 0.05 mol % or more, for the refining property.

From the viewpoint of not affecting glass properties, the total content of the above group is preferably 5.0 mol % or less, more preferably 2.0 mol % or less, and further preferably 1.0 mol % or less.

$SiO_2$, $Al_2O_3$, $B_2O_3$, and $P_2O_5$ are glass network formers.

From the viewpoint of enhancing stability and chemical durability of a glass structure, a total content of $SiO_2$, $Al_2O_3$, $B_2O_3$, and $P_2O_5$ in the glass member 101 is 70.0 mol % or more, preferably 75.0 mol % or more, more preferably 78.0 mol % or more, and particularly preferably 80.0 mol % or more.

From the viewpoint of preventing the melting temperature of the glass from rising and enhancing the refining property, the total content of $SiO_2$, $Al_2O_3$, $B_2O_3$, and $P_2O_5$ in the glass is 97.0 mol % or less, preferably 95.0 mol % or less, more preferably 93.0 mol % or less, and particularly preferably 90.0 mol % or less.

A preferred embodiment of the glass composition of the glass member 101 is such that 55.0 mol % to 85.0 mol % of $SiO_2$, 1.5 mol % to 14.5 mol % of $Al_2O_3$, 3.0 mol % to 14.0 mol % of $B_2O_3$, and 0 mol % to 3.5 mol % of $P_2O_5$ are included, and the total content of $SiO_2$, $Al_2O_3$, $B_2O_3$, and $P_2O_5$ in the glass member 101 is 70.0% to 97.0% as represented by mole percent based on oxides. Accordingly, the glass properties are more excellent.

A thickness of the glass member 101 is not particularly limited as long as the glass member 101 can support the Si—SiC member 105. Specifically, the thickness of the glass member 101 is preferably 2 mm to 40 mm.

The thickness of the glass member 101 is more preferably 3 mm or more, further preferably 5 mm or more, particularly preferably 10 mm or more, and most preferably 15 mm or more.

The thickness of the glass member 101 is more preferably 35 mm or less, further preferably 30 mm or less, and particularly preferably 25 mm or less.

In the case where the thickness of the glass member 101 is within the above range, a sufficient strength can be maintained as a supporting member.

The thickness of the glass member 101 can be measured by, for example, a caliper or a digital measure.

The average linear expansion coefficient $\beta$ of the glass member 101 at 20° C. to 200° C. is preferably 1.50 ppm/° C. to 5.00 ppm/° C. Hereinafter, the average linear expansion coefficient $\beta$ of the glass member 101 at 20° C. to 200° C. is also simply referred to as an average linear expansion coefficient $\beta$.

The average linear expansion coefficient $\beta$ is preferably 2.00 ppm/° C. or more, more preferably 2.50 ppm/° C. or more, and particularly preferably 2.60 ppm/° C. or more.

The average linear expansion coefficient $\beta$ is preferably 3.50 ppm/° C. or less, more preferably 3.25 ppm/° C. or less, further preferably 3.10 ppm/° C. or less, and particularly preferably 3.00 ppm/° C. or less.

In the case where the average linear expansion coefficient $\beta$ of the glass member 101 is in the above range, the average linear expansion coefficient of the glass member 101 and the average linear expansion coefficient of the Si—SiC member 105 can be readily matched with each other. The smaller $\beta$ is, the smaller distortion generated inside the glass when there is a temperature difference inside the glass member.

The average linear expansion coefficient $\beta$ can be measured by a dilatometer whose temperature range to be measured is 20° C. to 200° C., or a thermomechanical analyzer (TMA).

The absolute value $|\alpha-\beta|$, which is a value obtained by subtracting the average linear expansion coefficient $\beta$ of the glass member 101 from the average linear expansion coefficient $\alpha$ of the Si—SiC member 105, is 2.00 ppm/° C. or less. The absolute value $|\alpha-\beta|$ is preferably 1.00 ppm/° C. or less, more preferably 0.50 ppm/° C. or less, and particularly preferably 0.30 ppm/° C. or less.

In the case where the absolute value |α−β| is set to the above values or less, warpage of the obtained laminated member 100 can be prevented.

Between the Si—SiC member 105 and the glass member 101, since Si—SiC has a higher thermal conductivity than glass, a temperature difference may occur during use. Especially during cooling, since a tensile stress is applied to a surface opposite to the bonding layer of the glass, glass tends to break easily, and therefore, the average linear expansion coefficient β of the glass member 101 is preferably smaller than the average linear expansion coefficient α of the Si—SiC member 105.

The linear transmittance of the glass member 101 at the wavelength of 850 nm is 80% or more, preferably 85% or more, more preferably 88% or more, and further preferably 90% or more. In the case where the linear transmittance of the glass member 101 at the wavelength of 850 nm is 80% or more, a sufficient amount of infrared rays for heating use can be transmitted.

An upper limit of the linear transmittance of the glass member 101 is 100%.

The linear transmittance is a transmittance of light straightly transmitting through the glass member 101 in a thickness direction thereof with an incidence angle of incident light being 0 degrees, and can be measured at 20° C. by a spectrophotometer.

Examples of a method for setting the linear transmittance of the glass member 101 within the above ranges include a method of adjusting the content of $Fe_2O_3$ in the glass member 101 within the above ranges, and a method of forming an anti-reflective film to prevent surface reflection of the glass member 101. As a method of forming the anti-reflective film, generally known methods such as wet coating such as spray coating, spin coating, and flow coating, and dry coating such as sputtering and vapor deposition can be used.

The Young's modulus of the glass member 101 is preferably 40 GPa to 120 GPa.

The Young's modulus of the glass member 101 is more preferably 60 GPa or more, further preferably 65 GPa or more, and particularly preferably 70 GPa or more.

The Young's modulus of the glass member 101 is more preferably 100 GPa or less, further preferably 95 GPa or less, and particularly preferably 90 GPa or less.

In the case where the Young's modulus of the glass member 101 is within the above ranges, sufficient strength can be maintained as the supporting member, and an amount of warpage can be reduced.

The Young's modulus of the glass member 101 can be measured at 20° C. by an ultrasonic pulse method defined by Japanese Industrial Standards (JIS R1602.1995).

The melting temperature of the glass member 101 is preferably 1000° C. to 2000° C.

The melting temperature of the glass member 101 is more preferably 1300° C. or more, further preferably 1400° C. or more, and particularly preferably 1500° C. or more.

The melting temperature of the glass member 101 is more preferably 1900° C. or less, further preferably 1800° C. or less, and particularly preferably 1700° C. or less.

In the case where the melting temperature of the glass member 101 is within the above ranges, the refining property of the glass and solubility of the raw materials are excellent, and defects in the glass can be prevented.

The melting temperature of the glass member 101 indicates a temperature T2 (° C.) at which viscosity is measured by using a rotational viscometer and becomes $10^2$ dPa·s.

The devitrification temperature of the glass member 101 is preferably 800° C. to 1600° C.

The devitrification temperature of the glass member 101 is more preferably 900° C. or more, further preferably 1000° C. or more, and particularly preferably 1100° C. or more.

The devitrification temperature of the glass member 101 is more preferably 1500° C. or less, further preferably 1450° C. or less, and particularly preferably 1400° C. or less.

In the case where the devitrification temperature of the glass member 101 is within the above ranges, defects generated during glass production are reduced.

The devitrification temperature of the glass member 101 is a maximum value of a temperature at which when crushed glass particles are put in a platinum plate and heat-treated for 17 hours in an electric furnace controlled at a constant temperature, crystals are not precipitated on a surface and inside of the glass according to observation with an optical microscope after the heat treatment.

[Bonding Layer]

The bonding layer 103 is a member bonding the glass member 101 and the Si—SiC member 105 together.

Examples of resin included in the bonding layer 103 include epoxy resin, silicone resin, fluorine resin, and polyimide resin. The epoxy resin, the silicone resin, and the fluorine resin are preferred because of a superior heat resistance.

The resins may be used alone or in a combination of two or more kinds thereof.

A content of the resin is preferably 40 mass % to 100 mass %, more preferably 50 mass % to 90 mass %, and further preferably 60 mass % to 80 mass % with respect to a total mass of the bonding layer 103.

In the case where the content of the resin is within the above ranges, adhesion between the glass member 101 and the Si—SiC member 105 via the bonding layer 103 is more excellent, and a difference in the expansion coefficient from the Si—SiC member can be reduced.

The bonding layer 103 may or may not include components (hereinafter, also referred to as "other components") other than the resin. Specific examples of the other components include a plasticizer and a filler.

In the case where the bonding layer 103 includes the other components, a content of the other components is preferably 10 mass % to 50 mass %, more preferably 20 mass % to 40 mass %, and further preferably 25 mass % to 35 mass % with respect to the total mass of the bonding layer 103. In the case where the content of the other components is 50 mass % or less, adhesion between the glass member 101 and the Si—SiC member 105 via the bonding layer 103 is more excellent.

The bonding layer 103 may be include a resin film, a coating type adhesive, or the like.

In the case where the bonding layer 103 includes a resin film, the bonding layer 103 can be produced using, for example, a heat press device. A resin film constituting the bonding layer 103 is sandwiched between the glass member 101 and the Si—SiC member 105 (this configuration is adopted as a temporary laminate). The temporary laminate is heated to a temperature above a softening point of the resin film, and the temporary laminate is pressurized to bond the glass member 101 and the Si—SiC member 105. In order to prevent bubbles from getting caught during bonding, it is preferable to pressurize the temporary laminate under vacuum atmosphere.

In the case where the bonding layer 103 includes a coating type adhesive, the bonding layer 103 is coated on the glass member 101 by any known method in the related art, and the Si—SiC member 105 is laminated thereon.

In order to enhance an anchor effect, a contact surface, which faces the bonding layer 103, of the glass member 101 and a contact surface, which faces the bonding layer 103, of the Si—SiC member 105 may be roughened moderately through blasting or the like.

A thickness of the bonding layer 103 is preferably 0.001 mm to 0.300 mm.

The thickness of the bonding layer 103 may be 0.005 mm or more, may be 0.008 mm or more, or may be 0.010 mm or more.

The thickness of the bonding layer 103 may be 0.150 mm or less, may be 0.050 mm or less, or may be 0.030 mm or less.

The thickness of the bonding layer 103 can be calculated by using digital data of an image captured by SEM cross-sectional observation or using image processing software.

A linear transmittance of the bonding layer 103 at the wavelength of 850 nm is preferably 88% or more, more preferably 91% or more, further preferably 93% or more, and particularly preferably 95% or more. In the case where the linear transmittance of the bonding layer 103 is 88% or more, a sufficient amount of infrared rays for heating use can be transmitted.

An upper limit of the linear transmittance of the bonding layer 103 is 100%.

The linear transmittance is a transmittance of light straightly transmitting through the bonding layer 103 in a thickness direction thereof with an incidence angle of incident light being 0 degrees, and can be measured at 20° C. by a spectrophotometer.

A heat resistance temperature of the resin included in the bonding layer 103 is preferably 120° C. to 420° C. From the viewpoint of stress relief during use at a high temperature, a temperature of 120° C. to 300° C. is more preferable.

The heat resistance temperature of the resin included in the bonding layer 103 is further preferably 140° C. or more, particularly preferably 160° C. or more, and most preferably 180° C. or more.

The heat resistance temperature of the resin included in the bonding layer 103 may be 280° C. or less, 260° C. or less, or 240° C. or less.

The heat resistance temperature of the resin included in the bonding layer 103 is set to a temperature at which a mass of a measurement-target object is decreased by 1 mass %, which is obtained by conducting thermogravimetric analysis (TGA) under air atmosphere.

The average linear expansion coefficient $\gamma$ of the bonding layer 103 at 20° C. to 200° C. is preferably 2 ppm/° C. to 200 ppm/° C. Hereinafter, the average linear expansion coefficient $\gamma$ of the bonding layer 103 at 20° C. to 200° C. is also simply referred to as an average linear expansion coefficient $\gamma$.

The average linear expansion coefficient $\gamma$ is more preferably 4 ppm/° C. or more, further preferably 7 ppm/° C. or more, and particularly preferably 10 ppm/° C. or more.

The average linear expansion coefficient $\gamma$ is more preferably 100 ppm/° C. or less, further preferably 50 ppm/° C. or less, particularly preferably 30 ppm/° C. or less, and most preferably 20 ppm/° C.

In the case where the average linear expansion coefficient $\gamma$ of the bonding layer 103 is within the above ranges, adhesion is excellent and a difference in the expansion coefficient from the Si—SiC member can be reduced, and thus the laminated member 100 is excellent in the thermal shock resistance.

The average linear expansion coefficient $\gamma$ can be measured by a dilatometer whose temperature range to be measured is 20° C. to 200° C., or a thermomechanical analyzer (TMA).

As a method for setting the average linear expansion coefficient $\gamma$ of the bonding layer 103 to the above range, a method in which the above resins are used and a filler such as carbon or silica is blended is exemplified.

In the case where the resin film is used to produce the bonding layer 103, from the viewpoint of improving the adhesion between the Si—SiC member 105 and the glass member 101 and maintaining a shape of the entire member, a Young's modulus of the resin film is preferably 0.05 GPa or more, more preferably 0.10 GPa or more, and further preferably 0.15 GPa or more.

In the case where the resin film is used to produce the bonding layer 103, from the viewpoint of reducing stress generated by the difference in the expansion coefficient from the Si—SiC member, the Young's modulus of the resin film is preferably 3.5 GPa or less, more preferably 3.0 GPa or less, further preferably 2.0 GPa or less, particularly preferably 1.0 GPa or less, and most preferably 0.5 GPa or less.

The stress generated by the difference in the expansion coefficient from the Si—SiC member increases as the Young's modulus of the resin layer increases, and decreases as the Young's modulus decreases.

The Young's modulus of the resin layer can be measured at 25° C. by a testing method for elastic modulus defined by Japanese Industrial Standards (JIS K7171).

[Physical Properties and the like of Laminated Member]

The amount of warpage of the laminated member 100 is preferably 0.25 mm or less, more preferably 0.20 mm or less, further preferably 0.10 mm or less, and particularly preferably 0.05 mm or less.

In the case where the amount of warpage of the laminated member 100 is equal to or less than the above values, the stress can be prevented from concentrating on a specific portion when stress occurs, and thus the impact resistance can be further improved. In the case where the laminated member 100 is applied to a utilization for kitchen and the like, it is possible to prevent that the laminated member 100 reflects a distorted image of the surroundings due to the warpage of the laminated member 100 and the design is detracted. In the case where an object to be heated is placed on the laminated member 100, the object to be heated can be prevented from wobbling.

A lower limit of the amount of warpage of the laminated member 100 is 0 mm.

The amount of warpage of the laminated member 100 can be measured by a non-contact three-dimensional shape measuring instrument.

Examples of a method for setting the amount of warpage of the laminated member 100 within the above ranges include a method for setting the thicknesses of the glass member 101, the bonding layer 103, and the Si—SiC member 105, and types and contents of components constituting each member (layer) as described above.

The density of the laminated member 100 is preferably 2.40 g/cm$^3$ to 2.85 g/cm$^3$.

The density of the laminated member 100 is more preferably 2.45 g/cm$^3$ or more, further preferably 2.50 g/cm$^3$ or more, and particularly preferably 2.55 g/cm$^3$ or more.

The density of the laminated member 100 is more preferably 2.80 g/cm$^3$ or less, further preferably 2.75 g/cm$^3$ or less, and particularly preferably 2.70 g/cm$^3$ or less.

In the case where the density is in the above ranges, workability for incorporating the laminated member as a heating member into a housing is improved.

The density is a value obtained by dividing a total mass of the laminated member 100 by a total volume of the laminated member 100. The total mass of the laminated member 100 can be measured by a weight measuring instrument. The total volume of the laminated member 100 can be measured by a digital measure.

Examples of a method for setting the density of the laminated member 100 within the above ranges include a method for setting the thicknesses of the glass member 101, the bonding layer 103, and the Si—SiC member 105, and types and contents of components constituting each member (layer) as described above.

An area of an uppermost surface of the laminated member 100 on a side of the Si—SiC member 105 (a principal surface of the laminated member 100 on the side of the Si—SiC member 105) is preferably 0.01 m$^2$ to 10 m$^2$.

The area of the uppermost surface of the laminated member 100 is more preferably 0.07 m$^2$ or more, further preferably 0.15 m$^2$ or more, particularly preferably 0.30 m$^2$ or more, and most preferably 0.60 m$^2$ or more.

The area of the uppermost surface of the laminated member 100 is more preferably 8 m$^2$ or less, further preferably 4 m$^2$ or less, particularly preferably 2 m$^2$ or less, and most preferably 1 m$^2$ or less.

In the case where the area of the uppermost surface of the laminated member 100 is in the above range, workability for incorporating the laminated member as a heating member into the housing is improved.

The area of the uppermost surface is calculated by measuring dimensions of the laminated member 100 with a digital measure.

[Method for Producing Laminated Member]

Examples of a method for producing the laminated member 100 include a method in which the bonding layer 103 is disposed between the glass member 101 and the Si—SiC member 105, and then the glass member 101 and the Si—SiC member 105 are bonded via the bonding layer 103.

Examples of a specific method for producing the laminated member 100 include a method in which the glass member 101, the bonding layer 103, and the Si—SiC member 105 are laminated in this order and then bonded together at a temperature of 150° C. to 380° C.

[Another Embodiment]

As an example of the laminated member of the present invention, another embodiment of the laminated member (hereinafter, also referred to as "the laminated member according to another embodiment") different from the above laminated member 100 will be described.

The laminated member according to another embodiment further includes a second bonding layer lying on the above Si—SiC member 105, and a second Si—SiC member bonded to the Si—SiC member 105 via the second bonding layer.

The second Si—SiC member is configured in the same manner as the above Si—SiC member 105, and thus a description thereof is omitted.

By forming a structure in which the Si—SiC member 105 and the second Si—SiC member are laminated, a laminated member having a complicated shape can be readily produced. For example, in the case where a space for inserting a sensor for temperature measurement is included in the laminated member, one of the Si—SiC member 105 and the second Si—SiC member is grooved in advance, and is bonded to the other of the Si—SiC member 105 and the second Si—SiC member, so that the space can be readily included in the laminated member.

A method for bonding the Si—SiC member 105 and the second Si—SiC member via the second bonding layer is not particularly limited, and examples thereof include a bonding using a resin such as an epoxy resin and a fluorine resin, a bonding using a molten metal such as tin and indium, and a bonding using glass frit. In the case where the laminated member is assumed to be used as a heating member, a bonding using metal is preferable in terms of heat resistance and thermal conductivity.

In terms of the heat resistance and the thermal conductivity, the glass frit has a high heat resistance but has a low thermal conductivity, and the resin has a low heat resistance and a low thermal conductivity, and thus, the bonding using metal is preferable. Specific examples of metals include indium, tin, tin-based alloys, and lead-based alloys. In terms of the thermal conductivity, the heat resistance, and environmental load, tin metal and tin-based alloys are preferable in particular.

An example for bonding by using molten metal is described. The Si—SiC member 105 and the second Si—SiC member are heated to a desired temperature, for example, 250° C. to 270° C. While ultrasonic waves are applied to bonding surfaces of the Si—SiC member and the second Si—SiC member that have been heated, the molten metal at a temperature around the desired temperature (for example, 250° C. to 270° C.) is applied to the bonding surfaces, and thereafter, the bonding surfaces are overlaid on each other.

The laminated member according to the another embodiment may further include a third bonding layer lying on the second Si—SiC member and a third Si—SiC member bonded to the second Si—SiC member via the third bonding layer. The third bonding layer is configured in the same manner to the second bonding layer. The third Si—SiC member is configured in the same manner to the Si—SiC member 105. However, in terms of the thickness, the laminated member according to the another embodiment preferably does not include the third bonding layer and the third Si—SiC member.

The laminated member of the present invention may include a configuration capable of rapidly cooling the laminated member.

For example, the laminated member 100 may include a flow path disposed at least one between the glass member 101 and the bonding layer 103 and between the Si—SiC member 105 and the bonding layer 103. Alternatively, in the laminated member 100, at least one of the glass member 101 and the Si—SiC member 105 may be processed to serve as the flow path.

The laminated member according to the another embodiment may include a flow path that is disposed at least one between the glass member 101 and the bonding layer 103, between the Si—SiC member 105 and the bonding layer 103, between the Si—SiC member 105 and the second bonding layer, and between the second Si—SiC member and the second bonding layer. Alternatively, in the laminated member according to the another embodiment, at least one of the glass member 101, the Si—SiC member 105, and the second Si—SiC member may be processed to serve as the flow path.

The laminated member can be cooled by flowing water through the flow path.

The laminated member of the present invention may include an anti-reflective film for enhancing the transmittance and an irradiation efficiency.

For example, the laminated member 100 may include an anti-reflective film lying on a principal surface of the glass member 101 on an opposite side from the bonding layer 103 and/or a principal surface of the glass member 101 on a side of the bonding layer 103.

The laminated member according to the another embodiment may include an anti-reflective film lying on a principal surface of the Si—SiC member 105 on the side of the bonding layer 103 or a principal surface of the second Si—SiC member on a side of the second bonding layer.

In the case where the anti-reflective film is provided on a surface for transmitting the infrared rays, the irradiation efficiency (heating efficiency) can be enhanced.

The laminated member of the present invention may include a temperature sensor.

For example, the laminated member 100 may include a temperature sensor inside of the Si—SiC member 105. The laminated member according to the another embodiment may include a temperature sensor inside of the Si—SiC member 105 or inside of the second Si—SiC member.

A specific configuration including the temperature sensor is such that a hole is made in a side surface of the Si—SiC member 105 or the second Si—SiC member, and the temperature sensor is inserted into the hole. In this case, the temperature sensor is provided immediately under a principal surface of the Si—SiC member 105 on an opposite side from the bonding layer 103 or immediately under a principal surface of the second Si—SiC member on an opposite side from the second bonding layer. The temperature sensor is provided such that the temperature sensor does not come into contact with the bonding layer 103 or the second bonding layer and such that the temperature sensor is not exposed. The temperature sensor can measure a temperature of the principal surface of the Si—SiC member 105 on the opposite side from the bonding layer 103 or a temperature of the principal surface of the second Si—SiC member on the opposite side from the second bonding layer.

The laminated member of the present invention can be suitably used as a heating member. The laminated member of the present invention can be suitably used, for example, as a heating member of a heating cooking device.

The laminated member of the present invention may also be used as a kitchen worktop.

In inspection apparatuses and test apparatuses for conducting electrical tests of electronic devices, the laminated member of the present invention may be used as a material of a placing table on which the electronic devices are placed.

The laminated member of the present invention may have combined functions of a top plate for inspection apparatuses and test apparatuses for conducting electrical tests of heating cooking device and electronic devices, and a kitchen worktop.

[Glass Composition]

One aspect of the glass composition in the present description is a glass composition used for a glass member in a laminated member, the laminated member including the glass member, a bonding layer containing a resin and lying on the glass member, and a Si—SiC member lying on the bonding layer, in which the glass composition has a linear transmittance at a wavelength of 850 nm of 80% or more, the glass composition includes, as represented by mole percent based on oxides, 55.0 mol % to 85.0 mol % of $SiO_2$, 1.5 mol % to 22.0 mol % of $Al_2O_3$, 2.0 mol % to 14.0 mol % of $B_2O_3$, and 0 mol % to 5.0 mol % of $P_2O_5$, the glass composition has a total content of the $SiO_2$, the $Al_2O_3$, the $B_2O_3$, and the $P_2O_5$ of 70.0% to 97.0% as represented by mole percent based on oxides, the glass composition has an average linear expansion coefficient β at 20° C. to 200° C. of 1.50 ppm/° C. to 5.00 ppm/° C., the glass composition is used for a laminated member including a Si—SiC member having an average linear expansion coefficient α at 20° C. to 200° C. of 2.85 ppm/° C. to 4.00 ppm/° C., so that the laminated member has an absolute value |α−β|, which is a value obtained by subtracting the average linear expansion coefficient β of the glass member at 20° C. to 200° C. from the average linear expansion coefficient α of the Si—SiC member at 20° C. to 200° C., of 2.00 ppm/° C. or less.

Another aspect of the glass composition in the present description is a glass composition including, as represented by mole percent based on oxides:

55.0 mol % to 85.0 mol % of $SiO_2$;
1.5 mol % to 22.0 mol % of $Al_2O_3$;
2.0 mol % to 14.0 mol % of $B_2O_3$; and
0 mol % to 5.0 mol % of $P_2O_5$, in which a total content of the $SiO_2$, the $Al_2O_3$, the $B_2O_3$, and the $P_2O_5$ is 70.0% to 97.0% as represented by mole percent based on oxides, an average linear expansion coefficient β at 20° C. to 200° C. is 1.50 ppm/° C. to 5.00 ppm/° C., a linear transmittance at a wavelength of 850 nm is 80% or more.

The above glass composition is suitably used as a glass member constituting the above-described laminated member. By using the above glass composition as the glass member constituting the above-described laminated member, the laminated member has excellent temperature rise property, impact resistance, and thermal shock resistance.

Note that a glass composition, each physical property value, and the like in the above glass composition are the same as those described above with respect to the glass member of the laminated member of the present disclosure. Note that the linear transmittance at the wavelength of 850 nm in the above glass composition means a value when the glass composition is measured as a glass member.

In a laminated member including a glass member obtained using the above glass composition, the above description regarding the glass member of the laminated member also applies to the bonding layer and the Si—SiC member that constitute the laminated member.

EXAMPLES

Hereinafter, an embodiment of the present invention will be described with reference to Examples, but the embodiment of the present invention is not limited thereto.

[Glass Member]

Produced glass is shown in Table 1 and Table 2.

TABLE 1

| Type of glass member | | i-A | i-B | i-C | ii | iii | iv | v | vi |
|---|---|---|---|---|---|---|---|---|---|
| Composition (mol %) | $SiO_2$ | 66.4 | 66.4 | 66.4 | 67.3 | 66.6 | 82.9 | 80.9 | 100.0 |
| | $Al_2O_3$ | 13.0 | 13.0 | 13.0 | 8.6 | 12.1 | 1.8 | 2.0 | |
| | $B_2O_3$ | 5.6 | 5.6 | 5.6 | 6.3 | 6.3 | 11.3 | 13.0 | |
| | MgO | 8.0 | 8.0 | 8.0 | 5.5 | 3.5 | | | |

TABLE 1-continued

| | | | | | | | | | |
|---|---|---|---|---|---|---|---|---|---|
| | CaO | | 6.0 | 6.0 | 6.0 | 1.1 | 0.5 | | |
| | SrO | | 1.0 | 1.0 | 1.0 | | | | |
| | BaO | | | | | | | | |
| | ZnO | | | | | 7.7 | 6.0 | | |
| | $Li_2O$ | | | | | | 4.0 | | |
| | $Na_2O$ | | | | | 2.5 | 1.0 | 3.9 | 3.6 |
| | $K_2O$ | | | | | | | | 0.4 |
| | $ZrO_2$ | | | | | 1.0 | | | |
| | $TiO_2$ | | | | | | | | |
| | $P_2O_5$ | | | | | | | | |
| | $Fe_2O_3$ | | 0.0012 | 0.0036 | 0.0120 | 0.0013 | 0.0013 | 0.0047 | 0.0041 |
| | $SnO_2$ | | | | | | | 0.15 | 0.15 |
| | Sum | | 100.0 | 100.0 | 100.0 | 100.0 | 100.0 | 100.0 | 100.0 | 100.0 |
| $SiO_2 + Al_2O_3 + B_2O_3 + P_2O_5$ (mol %) | | | 85.0 | 850 | 85.0 | 82.2 | 85.0 | 96.0 | 95.9 | 100.0 |
| MgO + CaO + SrO + BaO + ZnO (mol %) | | | 15.0 | 15.0 | 15.0 | 14.3 | 10.0 | 0.0 | 0.0 | 0.0 |
| $Li_2O + Na_2O + K_2O$ (mol %) | | | 0.0 | 0.0 | 0.0 | 2.5 | 5.0 | 3.9 | 4.0 | 0.0 |
| Thickness | mm | | 14 | 5 | 14 | 14 | 14 | 14 | 14 | 14 |
| Average linear expansion coefficient β | ppm/° C. | | 3.10 | 3.10 | 3.10 | 3.20 | 3.20 | 3.30 | 3.30 | 0.50 |
| Linear transmittance | % | | 91.5 | 91.4 | 79.1 | 91.4 | 91.7 | 86.8 | 88.5 | 92.8 |
| Young's modulus | GPa | | 84 | 84 | 84 | 78 | 80 | 64 | 60 | 74 |
| Melting temperature (T2) | ° C. | | 1642 | 1642 | 1642 | 1646 | 1610 | 1980 | 1900 | Unmeasurable |
| Devitrification temperature | ° C. | | 1275 | 1275 | 1275 | 1325 | 1325 | 1050 | 1075 | 1200 |
| Density | g/cm³ | | 2.46 | 2.46 | 2.46 | 2.51 | 2.45 | 2.23 | 2.23 | 2.20 |
| Phase separation | | | A | A | A | A | A | A | A | A |

| Type of glass member | | vii | viii | ix | x | xi | xii | xiii | xiv |
|---|---|---|---|---|---|---|---|---|---|
| Composition (mol %) | $SiO_2$ | 66.5 | 63.5 | 71.7 | 64.0 | 65.6 | 66.5 | 66.5 | 66.0 |
| | $Al_2O_3$ | 12.0 | 15.0 | 0.8 | 13.7 | 12.0 | 12.0 | 12.5 | 16.0 |
| | $B_2O_3$ | 10.0 | 10.0 | | 13.1 | 10.4 | 10.0 | 7.8 | 4.0 |
| | MgO | 6.5 | 5.5 | 4.2 | 2.0 | 1.0 | 6.5 | 7.3 | 7.5 |
| | CaO | 4.5 | 4.0 | 10.1 | 0.5 | | 4.2 | 5.1 | 5.5 |
| | SrO | 0.5 | 2.0 | | | | 0.8 | 0.9 | 1.0 |
| | BaO | | | | | | | | |
| | ZnO | | | | | | | | |
| | $Li_2O$ | | | | 1.4 | 0.4 | | | |
| | $Na_2O$ | | | 13.2 | 2.2 | 0.6 | | | |
| | $K_2O$ | | | | | | | | |
| | $ZrO_2$ | | | | | | | | |
| | $TiO_2$ | | | | | | | | |
| | $P_2O_5$ | | | | 3.0 | 9.9 | | | |
| | $Fe_2O_3$ | 0.0012 | 0.0034 | 0.0015 | 0.0013 | 0.0013 | 0.0012 | 0.0012 | 0.0012 |
| | $SnO_2$ | | | | 0.10 | 0.10 | | | |
| | Sum | 100.0 | 100.0 | 100.0 | 1000 | 100.0 | 100.0 | 100.0 | 100.0 |
| $SiO_2 + Al_2O_3 + B_2O_3 + P_2O_5$ (mol %) | | 88.5 | 88.5 | 72.5 | 93.8 | 97.9 | 88.5 | 86.8 | 86.0 |
| MgO + CaO + SrO + BaO + ZnO (mol %) | | 11.5 | 11.5 | 14.3 | 2.5 | 1.0 | 11.5 | 13.3 | 14.0 |
| $Li_2O + Na_2O + K_2O$ (mol %) | | 0.0 | 0.0 | 13.2 | 3.6 | 1.0 | 0.0 | 0.0 | 0.0 |
| Thickness | mm | 14 | 14 | 14 | 14 | 14 | 14 | 14 | 14 |
| Average linear expansion coefficient β | ppm/° C. | 2.80 | 2.90 | 8.10 | 3.00 | Unmeasurable | 2.70 | 2.85 | 2.90 |
| Linear transmittance | % | 91.7 | 89.9 | 91.0 | 91.2 | Unmeasured | 91.3 | 91.2 | 90.7 |
| Young's modulus | GPa | 77 | 71 | 73 | 68 | Unmeasured | 77 | 80 | 87 |
| Melting temperature (T2) | ° C. | 1660 | 1602 | 1450 | 1700 | 1890 | 1661 | 1655 | 1637 |
| Devitrification temperature | ° C. | 1350 | >1400 | 1020 | 1400 | Unmeasured | 1325 | 1325 | 1450 |
| Density | g/cm³ | 2.38 | 2.44 | 2.52 | 2.33 | 2.31 | 2.40 | 2.42 | 2.48 |
| Phase separation | | A | A | A | A | C | A | A | A |

TABLE 2

| Type of glass member | | xv | xvi | xvii | xviii | xix | xx | xxi |
|---|---|---|---|---|---|---|---|---|
| Composition (mol %) | $SiO_2$ | 66.0 | 66.0 | 64.0 | 63.5 | 63.0 | 65.0 | 64.0 |
| | $Al_2O_3$ | 15.0 | 14.0 | 18.0 | 20.0 | 22.0 | 16.0 | 16.0 |
| | $B_2O_3$ | 5.0 | 5.0 | 4.0 | 3.0 | 2.0 | 4.0 | 4.0 |
| | MgO | 8.0 | 9.5 | 7.5 | 7.3 | 7.0 | 7.0 | 6.5 |
| | CaO | 5.0 | 4.5 | 5.5 | 5.3 | 5.0 | 4.0 | 2.5 |
| | SrO | 1.0 | 1.0 | 1.0 | 1.0 | 1.0 | 1.0 | 1.0 |
| | BaO | | | | | | | |
| | ZnO | | | | | | 3.0 | 6.0 |
| | $Li_2O$ | | | | | | | |
| | $Na_2O$ | | | | | | | |
| | $K_2O$ | | | | | | | |

TABLE 2-continued

| | | | | | | | | |
|---|---|---|---|---|---|---|---|---|
| | ZrO$_2$ | | | | | | | |
| | TiO$_2$ | | | | | | | |
| | P$_2$O$_5$ | | | | | | | |
| | Fe$_2$O$_3$ | 0.0012 | 0.0012 | 0.0012 | 0.0012 | 0.0012 | 0.0012 | 0.0012 |
| | SnO$_2$ | | | | | | | |
| | Sum | 100.0 | 100.0 | 100.0 | 100.0 | 100.0 | 100.0 | 100.0 |
| SiO$_2$ + Al$_2$O$_3$ + B$_2$O$_3$ + P$_2$O$_5$ (mol %) | | 86.0 | 85.0 | 86.0 | 86.5 | 87.0 | 85.0 | 84.0 |
| MgO + CaO + SrO + BaO + ZnO (mol %) | | 14.0 | 15.0 | 14.0 | 13.5 | 13.0 | 15.0 | 16.0 |
| Li$_2$O + Na$_2$O + K$_2$O (mol %) | | 0.0 | 0.0 | 0.0 | 0.0 | 0.0 | 0.0 | 0.0 |
| Thickness | mm | 14 | 14 | 14 | 14 | 14 | 14 | 14 |
| Average linear expansion coefficient β | ppm/° C. | 2.90 | 2.95 | 2.90 | 2.85 | 2.80 | 2.80 | 2.65 |
| Linear transmittance | % | 91.2 | 91.0 | 90.3 | 88.2 | 87.6 | 91.1 | 90.4 |
| Young's modulus | GPa | 86 | 86 | 89 | 92 | 94 | 88 | 90 |
| Melting temperature (T2) | ° C. | 1647 | 1644 | 1600 | 1604 | 1601 | 1597 | 1584 |
| Devitrification temperature | ° C. | 1450 | 1350 | >1500 | >1500 | >1500 | 1450 | 1450 |
| Density | g/cm$^3$ | 2.47 | 2.47 | 2.50 | 2.52 | 2.54 | 2.53 | 2.57 |
| Phase separation | | A | A | A | A | A | A | A |

| | | | | | | | | |
|---|---|---|---|---|---|---|---|---|
| Type of glass member | | xxii | xxiii | xxiv | xxv | xxvi | xxvii | xxviii | xxix |
| Composition (mol %) | SiO$_2$ | 64.0 | 66.0 | 66.0 | 66.0 | 66.0 | 65.0 | 66.6 | 66.6 |
| | Al$_2$O$_3$ | 16.0 | 14.0 | 16.0 | 16.0 | 16.0 | 15.0 | 12.0 | 12.0 |
| | B$_2$O$_3$ | 4.0 | 8.0 | 5.0 | 5.0 | 5.0 | 5.0 | 8.0 | 9.0 |
| | MgO | 7.5 | 6.5 | 7.0 | 7.0 | 7.0 | 8.0 | 2.5 | 2.0 |
| | CaO | 5.5 | 4.0 | 4.0 | 4.0 | 4.0 | 5.0 | 0.5 | 0.5 |
| | SrO | 1.0 | 1.0 | 1.0 | 1.0 | 1.0 | 1.0 | | |
| | BaO | | 0.5 | | | | | | |
| | ZnO | | | | | | | 6.0 | 6.0 |
| | Li$_2$O | | | 1.0 | | | | 3.5 | 3.0 |
| | Na$_2$O | | | | 1.0 | | | 0.9 | 0.9 |
| | K$_2$O | | | | | 1.0 | | | |
| | ZrO$_2$ | | | | | | | | |
| | TiO$_2$ | | | | | | 1.0 | | |
| | P$_2$O$_5$ | 2.0 | | | | | | | |
| | Fe$_2$O$_3$ | 0.0012 | 0.0012 | 0.0012 | 0.0012 | 0.0012 | 0.0012 | 0.0012 | 0.0012 |
| | SnO$_2$ | | | | | | | | |
| | Sum | 100.0 | 100.0 | 100.0 | 100.0 | 100.0 | 100.0 | 100.0 | 100.0 |
| SiO$_2$ + Al$_2$O$_3$ + B$_2$O$_3$ + P$_2$O$_5$ (mol %) | | 86.0 | 88.0 | 87.0 | 87.0 | 87.0 | 85.0 | 86.6 | 87.6 |
| MgO + CaO + SrO + BaO + ZnO (mol %) | | 14.0 | 12.0 | 12.0 | 12.0 | 12.0 | 14.0 | 9.0 | 8.5 |
| Li$_2$O + Na$_2$O + K$_2$O (mol %) | | 0.0 | 0.0 | 1.0 | 1.0 | 1.0 | 0.0 | 4.4 | 3.9 |
| Thickness | mm | 14 | 14 | 14 | 14 | 14 | 14 | 14 | 14 |
| Average linear expansion coefficient β | ppm/° C. | 2.85 | 2.70 | 2.85 | 2.90 | 2.90 | 2.85 | 2.95 | 2.80 |
| Linear transmittance | % | 91.0 | 91.3 | 90.9 | 90.5 | 90.8 | 91.0 | 91.6 | 90.9 |
| Young's modulus | GPa | 84 | 80 | 86 | 85 | 84 | 85 | 85 | 83 |
| Melting temperature (T2) | ° C. | 1650 | 1652 | 1651 | 1657 | 1666 | 1640 | 1639 | 1639 |
| Devitrification temperature | ° C. | 1350 | 1450 | 1450 | 1450 | 1450 | 1450 | 1325 | 1325 |
| Density | g/cm$^3$ | 2.47 | 2.43 | 2.46 | 2.46 | 2.45 | 2.48 | 2.48 | 2.47 |
| Phase separation | | A | A | A | A | A | A | A | A |

[Glass Producing Procedure]

The glass (i-A) to (v) and (vii) to (xxix) in Table 1 and Table 2 were produced as follows so as to have the glass compositions shown in Table 1 and Table 2 as represented by mole percent based on oxides. Note that a blank in Table 1 and Table 2 means that the corresponding component is not included.

First, commonly used glass raw materials such as oxides, hydroxides, carbonates, sulfates, halides, or nitrates were selected as necessary and weighed out to 10000 g as glass. Next, the mixed raw materials were put into a platinum crucible, placed in an electrical resistance furnace at 1500° C. to 1700° C., melted for about 12 hours, defoamed, and homogenized. The obtained molten glass was poured into a mold, held at a temperature of a glass transition point +50° C. for 1 hour, and then cooled to a room temperature at a rate of 0.5° C./min to obtain a glass block.

As the glass (vi) in Table 1, synthetic quartz glass (product name: AQ) produced by AGC Inc. was used.

Each of the obtained glass blocks was cut, ground, and polished to thereby obtain a glass member (having a length of 300 mm and a width of 300 mm).

[Physical Properties of Glass Member]

The following measurements were conducted on the obtained glass member. Measurement results are shown in Table 1 and Table 2.

The thickness was measured at 20° C. with a digital measure.

The average linear expansion coefficient β was measured by a high precision dilatometer "DIL402 Expedis" produced by NETZSCH-Geratebau GmbH in the temperature range of 20° C. to 200° C. Note that the glass (xi) in Table 1 was cloudy due to phase separation, and the glass (xi) clearly cannot be used as a glass member, and thus the average linear expansion coefficient β thereof was not measured.

The linear transmittance was measured at 20° C. and a wavelength of 850 nm with a spectrophotometer.

The glass (xi) in Table 1 was cloudy due to phase separation, and the linear transmittance thereof was clearly less than 80%, and thus the linear transmittance thereof was not measured.

The Young's modulus was measured at 20° C. by an ultrasonic pulse method defined by Japanese Industrial Standards (JIS R1602:1995). Note that the glass (xi) in Table 1 was cloudy due to phase separation, and the glass (xi) clearly cannot be used as a glass member, and thus the Young's modulus thereof was not measured.

The melting temperature (T2) indicates a temperature T2 (° C.) at which viscosity is measured by using a rotational viscometer and becomes $10^2$ dPa·s.

Note that the melting temperatures (T2) of the glass (iv) and the glass (v) in Table 1 could not be measured, and thus the melting temperatures were calculated by extrapolation. The glass (vi) could not be measured with a rotational viscometer because its viscosity was too high.

The devitrification temperature is a maximum value (° C.) of a temperature at which when crushed glass particles are put in a platinum plate and heat-treated for 17 hours in an electric furnace controlled at a constant temperature, crystals are not precipitated on a surface and inside of the glass according to observation with an optical microscope after the heat treatment. Note that the glass (xi) in Table 1 was cloudy due to phase separation, and the glass (xi) clearly cannot be used as a glass member, and thus the devitrification temperature thereof was not measured.

The density was measured by the Archimedes method.

The phase separation was evaluated by observing the glass member with a scanning electron microscope (SEM), and the case where the phase separation was not confirmed was indicated as "A", and the case where the phase separation was confirmed was indicated as

[Si—SiC Member]

Produced Si—SiC members are shown in Table 3.

then sintered at 1900° C. in an electric furnace under an inert atmosphere of argon to thereby obtain a sintered body. Porosity of the sintered body was 18.2%.

Next, a sintered body A1 was transferred to another electric furnace, high-purity silicon was melt and the sintered body A1 was impregnated with molten high-purity silicon under vacuum at 1500° C. to thereby obtain a Si—SiC member in which all pores were filled with high-purity silicon. A content of iron contained in the Si—SiC member was 2.2 ppm.

Next, the Si—SiC member was processed to have a length of 30 cm, a width of 30 cm, and thicknesses as shown in Table 3, and the Si—SiC members (a-1) to (a-3) were obtained.

The Si—SiC member (b) was produced in the same manner as the Si—SiC member (a-1) except that the solid content concentration of the slurry was changed to about 79 mass %.

The Si—SiC member (c) was produced in the same manner as the Si—SiC member (a-1) except that the solid content concentration of the slurry was changed to about 61 mass %.

The Si—SiC member (d) was produced as follows.

Into a kneader (produced by Miyazaki Iron Works Co., Ltd., model number: MP100) were added 48.2 mass % of SiC powder (produced by Pacific Rundum Co., Ltd., model number: GMF-12S (average particle diameter 0.7 μm)), 25.0 mass % of silicon powder (produced by Yamaishi Metal Co., Ltd., model number: No. 700 (average particle diameter 2.5 μm)), 5.5 mass % of METOLOSE (produced by Shin-Etsu Chemical Co., Ltd., model number: SM8000) as a binder, and 21.5 mass % of pure water, followed by and kneading for 6 hours to thereby obtain a clay.

The obtained clay was introduced into an extrusion molding machine (made by Miyazaki Iron Works Co., Ltd., model number: FM100), and was extruded and molded

TABLE 3

| Type of Si—SiC member | | a-1 | a-2 | a-3 | b | c | d | e | f |
|---|---|---|---|---|---|---|---|---|---|
| Composition | Si | 14 | 14 | 14 | 11.7 | 29 | 57 | 10.5 | 31 |
| (mass %) | SiC | 86 | 86 | 86 | 88.3 | 71 | 43 | 89.5 | 69 |
| | Sum | 100 | 100 | 100 | 100 | 100 | 100 | 100 | 100 |
| Thickness | mm | 5 | 10 | 15 | 5 | 5 | 5 | 5 | 10 |
| Average linear expansion coefficient α | ppm/° C. | 3.06 | 3.06 | 3.06 | 3.17 | 2.88 | 2.58 | 3.14 | 2.69 |
| Thermal conductivity (20° C.) | W/m · K | 230 | 230 | 230 | 203 | 234 | 256 | 168 | 223 |
| Young's modulus | GPa | 388 | 388 | 388 | 391 | 379 | 221 | 403 | 366 |
| Flexural strength | MPa | 219 | 219 | 219 | 221 | 241 | 82 | 233 | 204 |
| Vickers hardness | GPa | 23.5 | 23.5 | 23.5 | 24.1 | 23.4 | 9.1 | 23.8 | 20.7 |

[Si—SiC Member Producing Procedure]

The Si—SiC members (a-1) to (a-3) were produced as follows.

An α-SiC powder A1 was classified with a 325-mesh sieve to obtain an α-SiC powder A2 (having maximum particle size of 44 μm, and average particle size of 8 μm). The α-SiC powder A2 was washed with mixed acid (hydrofluoric acid:nitric acid=2:1 (mass ratio)) and pure water to obtain an α-SiC powder A3 (having iron content of 2.1 mass ppm). The α-SiC powder A3, the pure water, and acrylic resin emulsion (binder) were mixed to thereby obtain slurry (having solid content concentration of about 75 mass %).

Next, the slurry was poured into a plaster mold to obtain a molded body (size: 320 mm×320 mm×16 mm). The obtained molded body was dried at 50° C. for 14 days and under conditions of a head pressure of 1.0 MPa and a discharge speed of 1200 g/min to thereby obtain a molded body. The obtained molded body was dried at 50° C. for 14 days and then heated under air atmosphere at 450° C. for 3 hours and degreased to obtain a degreased body.

The obtained degreased body was baked in a carbon baking furnace under conditions of 1700° C. under vacuum atmosphere of $10^{-3}$ Pa for 2 hours to obtain a sintered body.

The obtained sintered body was impregnated with Si under conditions of 1500° C. with argon atmosphere to thereby obtain a Si—SiC member. The obtained Si—SiC member was processed to have a length of 30 cm, a width of 30 cm, and thicknesses as shown in Table 3 to thereby obtain the Si—SiC member (d).

The Si—SiC member (e) was produced in the same manner as the Si—SiC member (a-1) except that the solid content concentration of the slurry was changed to about 77 mass %.

The Si—SiC member (f) was produced in the same manner as the Si—SiC member (a-1) except that the solid content concentration of the slurry was changed to about 58 mass %.

[Physical Properties of Si—SiC Member]

The following measurements were conducted on the obtained Si—SiC members (a-1) to (f). Measurement results are shown in Table 3.

Each of component amounts (compositions) in the Si—SiC members was measured by an inductively coupled plasma mass spectrometer ICP-MS (produced by Shimadzu Corporation).

The thicknesses were measured at 20° C. using a caliper (AD-5764A) produced by A&D Company, Limited.

The average linear expansion coefficient α was measured by a thermomechanical analyzer (TMA) "TMA4000SA" produced by BrukerAXS GmbH in the temperature range of 20° C. to 200° C.

The thermal conductivity was measured under a temperature of 20° C. by a laser flash thermal measurement device "MODEL LFA-502" produced by Kyoto Electronics Manufacturing Co., Ltd.

The Young's modulus was measured at 20° C. by testing methods for elastic modulus (dynamic elastic modulus method) defined by Japanese Industrial Standards (JIS R1602:1995) using an Auto Com universal material testing instrument "AC-300KN" produced by TSE Co, Ltd.

The flexural strength was measured at 20° C. by a testing method for flexural strength (4-point flexural strength) defined by Japanese Industrial Standards (JIS R1601:2008) using the Auto Com universal material testing instrument "AC-300KN" produced by TSE Co, Ltd.

The Vickers hardness was measured at 20° C. by pushing in for 15 seconds with a pushing load of 10 kgf using a Vickers hardness testing system (produced by Nippon Steel & Sumikin Technology Co., Ltd.).

[Bonding Layer]

For each resin (resin film, coating type adhesive) shown in Table 4, the following measurements were performed. Measurement results are shown in Table 4.

In Table 4, the fluorine resin used was EA-2000 (resin film) manufactured by AGC Inc., and the epoxy resin used was TB2237J (coating type adhesive) manufactured by ThreeBond Co., Ltd., and the polyimide resin used was KPI-MX300F (resin film) manufactured by Kawamura Sangyo Co., Ltd.

Note that since the epoxy resin is a coating type adhesive, the following measurements were performed in a sheet-shaped state.

TABLE 4

| Type of resin (bonding layer) Type of resin constituting resin (bonding layer) | | F Fluorine resin | EP Epoxy resin | PI Polyimide resin |
|---|---|---|---|---|
| Thickness | mm | 0.03 | 0.03 | 0.03 |
| Linear transmittance | % | 95.4 | 90.4 | 87.8 |
| Heat resistance temperature | ° C. | 411 | 255 | 345 |
| Average linear expansion coefficient γ | ppm/° C. | 188.2 | 15.1 | 36.1 |
| Young's modulus | GPa | 0.16 | 2.3 | 3.9 |

The thicknesses were measured with a digital measure.

The linear transmittance was measured at 20° C. and a wavelength of 850 nm with a spectrophotometer.

The heat resistance temperature was set to a temperature at which a mass of the resin film or the coating type adhesive decreased by 1 mass %, which was obtained by conducting thermogravimetric analysis (TGA) under air atmosphere.

The average linear expansion coefficient γ was measured by the thermomechanical analyzer (TMA) "TMA4000SA" produced by Bruker AXS GmbH in the temperature range of 20° C. to 200° C.

Note that the average linear expansion coefficient γ of the resin film or the coating type adhesive and the average linear expansion coefficient γ of the bonding layer obtained using the resin film or the coating type adhesive, which will be described later, were the same value.

The Young's modulus was measured at 25° C. by testing methods for elastic modulus defined by Japanese Industrial Standards (JIS K7171) using a universal material testing instrument (model type 5966) produced by Instron Corporation.

[Laminated Member]

Produced laminated members are shown in Table 5 to Table 7.

TABLE 5

| Example | 1 | 2 | 3 | 4 | 5 | 6 | 7 |
|---|---|---|---|---|---|---|---|
| Glass member | i-A | i-A | i-A | i-A | i-A | i-A | i-A |
| Bonding layer | F | EP | PI | F | F | F | F |
| Si—SiC member | a-1 | a-1 | a-1 | b | c | d | e |
| Temperature rise evaluation | A | A | A | A | A | A | A |
| Impact resistance evaluation | A | A | A | A | A | A | A |
| Heat resistance evaluation | A | A | C | A | A | A | A |
| Thermal shock resistance evaluation | A | A | A | A | A | C | A |
| α (ppm/° C.) | 3.06 | 3.06 | 3.06 | 3.17 | 2.88 | 2.58 | 3.14 |
| β (ppm/° C.) | 3.10 | 3.10 | 3.10 | 3.10 | 3.10 | 3.10 | 3.10 |
| \|α − β\| (ppm/° C.) | 0.04 | 0.04 | 0.04 | 0.07 | 0.22 | 0.52 | 0.04 |
| Amount of warpage (mm) | 0.001 | 0.013 | 0.058 | 0.023 | 0.021 | 0.071 | 0.022 |
| Density (g/cm$^3$) | 2.60 | 2.60 | 2.60 | 2.62 | 2.58 | 2.51 | 2.63 |
| Area (m$^2$) | 0.09 | 0.09 | 0.09 | 0.09 | 0.09 | 0.09 | 0.09 |
| Thickness of bonding layer (mm) | 0.017 | 0.036 | 0.039 | 0.018 | 0.018 | 0.019 | 0.017 |

TABLE 5-continued

| Example | 8 | 9 | 10 | 11 | 12 | 13 | 14 |
|---|---|---|---|---|---|---|---|
| Glass member | i-A | i-B | ii | iii | iv | v | vi |
| Bonding layer | F | F | F | F | F | F | F |
| Si—SiC member | f | a-2 | a-1 | a-1 | a-1 | a-1 | a-1 |
| Temperature rise evaluation | A | A | A | A | A | A | A |
| Impact resistance evaluation | B | A | A | A | A | A | A |
| Heat resistance evaluation | A | A | A | A | A | A | A |
| Thermal shock resistance evaluation | C | A | A | A | A | A | A |
| α (ppm/° C.) | 2.69 | 3.06 | 3.06 | 3.06 | 3.06 | 3.06 | 3.06 |
| β (ppm/° C.) | 3.10 | 3.10 | 3.20 | 3.20 | 3.30 | 3.30 | 0.50 |
| \|α − β\| (ppm/° C.) | 0.41 | 0.04 | 0.14 | 0.14 | 0.24 | 0.24 | 2.56 |
| Amount of warpage (mm) | 0.013 | 0.061 | 0.005 | 0.010 | 0.054 | 0.057 | 0.472 |
| Density (g/cm³) | 2.63 | 2.83 | 2.58 | 2.68 | 2.44 | 2.41 | 2.41 |
| Area (m²) | 0.09 | 0.09 | 0.09 | 0.09 | 0.09 | 0.09 | 0.09 |
| Thickness of bonding layer (mm) | 0.017 | 0.023 | 0.057 | 0.013 | 0.016 | 0.033 | 0.059 |

TABLE 6

| Example | 15 | 16 | 17 | 18 | 19 | 20 | 21 |
|---|---|---|---|---|---|---|---|
| Glass member | — | — | i-A | i-A | i-A | vii | viii |
| Bonding layer | — | — | — | EP | EP | EP | EP |
| Si—SiC member | a-3 | a-1 | — | d | f | a-1 | a-2 |
| Temperature rise evaluation | C | A | C | A | A | A | A |
| Impact resistance evaluation | A | C | — | A | A | A | A |
| Heat resistance evaluation | A | A | A | A | A | A | A |
| Thermal shock resistance evaluation | — | — | — | C | C | A | A |
| α (ppm/° C.) | 3.06 | 3.06 | — | 2.58 | 2.69 | 3.06 | 3.06 |
| β (ppm/° C.) | — | — | 3.10 | 3.10 | 3.10 | 2.80 | 2.90 |
| \|α − β\| (ppm/° C.) | — | — | — | 0.52 | 0.41 | 0.26 | 0.16 |
| Amount of warpage (mm) | 0.009 | 0.012 | 0.009 | 0.088 | 0.024 | 0.013 | 0.015 |
| Density (g/cm³) | 3.01 | 3.01 | 2.46 | 2.51 | 2.63 | 2.60 | 2.68 |
| Area (m²) | 0.09 | 0.09 | 0.09 | 0.09 | 0.09 | 0.09 | 0.09 |
| Thickness of bonding layer (mm) | — | — | — | 0.019 | 0.027 | 0.048 | 0.029 |

| Example | 22 | 23 | 24 | 25 | 26 | 27 | 28 |
|---|---|---|---|---|---|---|---|
| Glass member | vii | ix | x | xi | xii | xiii | xiv |
| Bonding layer | EP | EP | EP | EP | EP | EP | EP |
| Si—SiC member | a-2 | a-1 | a-2 | a-2 | a-1 | a-1 | a-1 |
| Temperature rise evaluation | A | A | A | C | A | A | A |
| Impact resistance evaluation | A | B | A | — | A | A | A |
| Heat resistance evaluation | A | A | A | — | A | A | A |
| Thermal shock resistance evaluation | A | A | A | — | A | A | A |
| α (ppm/° C.) | 3.06 | 3.06 | 3.06 | 3.06 | 3.06 | 3.06 | 3.06 |
| β (ppm/° C.) | 2.80 | 8.10 | 3.00 | Unmeasurable | 2.70 | 2.85 | 2.90 |
| \|α − β\| (ppm/° C.) | 0.26 | 5.04 | 0.06 | — | 0.36 | 0.21 | 0.16 |
| Amount of warpage (mm) | 0.016 | 0.821 | 0.003 | 0.025 | 0.023 | 0.011 | 0.010 |
| Density (g/cm³) | 2.69 | 2.63 | 2.65 | 2.64 | 2.56 | 2.58 | 2.62 |
| Area (m²) | 0.09 | 0.09 | 0.09 | 0.09 | 0.09 | 0.09 | 0.09 |
| Thickness of bonding layer (mm) | 0.033 | 0.052 | 0.031 | 0.036 | 0.035 | 0.032 | 0.044 |

TABLE 7

| Example | 29 | 30 | 31 | 32 | 33 | 34 | 35 | 36 |
|---|---|---|---|---|---|---|---|---|
| Glass member | xv | xvi | xvii | xviii | xix | xx | xxi | xxii |
| Bonding layer | EP | EP | EP | EP | EP | EP | EP | EP |
| Si—SiC member | a-1 | a-1 | a-1 | a-1 | a-1 | a-1 | a-1 | a-1 |
| Temperature rise evaluation | A | A | A | A | A | A | A | A |
| Impact resistance evaluation | A | A | A | A | A | A | A | A |
| Heat resistance evaluation | A | A | A | A | A | A | A | A |
| Thermal shock resistance evaluation | A | A | A | A | A | A | A | A |

TABLE 7-continued

| | | | | | | | | |
|---|---|---|---|---|---|---|---|---|
| α (ppm/° C.) | 3.06 | 3.06 | 3.06 | 3.06 | 3.06 | 3.06 | 3.06 | 3.06 |
| β (ppm/° C.) | 2.90 | 2.95 | 2.90 | 2.85 | 2.80 | 2.80 | 2.65 | 2.85 |
| \|α − β\| (ppm/° C.) | 0.16 | 0.11 | 0.16 | 0.21 | 0.26 | 0.26 | 0.41 | 0.21 |
| Amount of warpage (mm) | 0.017 | 0.018 | 0.018 | 0.016 | 0.015 | 0.013 | 0.028 | 0.015 |
| Density (g/cm$^3$) | 2.61 | 2.61 | 2.63 | 2.65 | 2.66 | 2.66 | 2.69 | 2.61 |
| Area (m$^2$) | 0.09 | 0.09 | 0.09 | 0.09 | 0.09 | 0.09 | 0.09 | 0.09 |
| Thickness of bonding layer (mm) | 0.038 | 0.028 | 0.018 | 0.051 | 0.034 | 0.053 | 0.023 | 0.029 |

| Example | 37 | 38 | 39 | 40 | 41 | 42 | 43 |
|---|---|---|---|---|---|---|---|
| Glass member | xxiii | xxiv | xxv | xxvi | xxvii | xxviii | xxix |
| Bonding layer | EP | EP | EP | EP | EP | EP | EP |
| Si—SiC member | a-1 | a-1 | a-1 | a-1 | a-1 | a-1 | a-1 |
| Temperature rise evaluation | A | A | A | A | A | A | A |
| Impact resistance evaluation | A | A | A | A | A | A | A |
| Heat resistance evaluation | A | A | A | A | A | A | A |
| Thermal shock resistance evaluation | A | A | A | A | A | A | A |
| α (ppm/° C.) | 3.06 | 3.06 | 3.06 | 3.06 | 3.06 | 3.06 | 3.06 |
| β (ppm/° C.) | 2.70 | 2.85 | 2.90 | 2.90 | 2.85 | 2.95 | 2.80 |
| \|α − β\| (ppm/° C.) | 0.36 | 0.21 | 0.16 | 0.16 | 0.21 | 0.11 | 0.26 |
| Amount of warpage (mm) | 0.019 | 0.014 | 0.019 | 0.019 | 0.017 | 0.022 | 0.017 |
| Density (g/cm$^3$) | 2.58 | 2.60 | 2.60 | 2.60 | 2.56 | 2.62 | 2.61 |
| Area (m$^2$) | 0.09 | 0.09 | 0.09 | 0.09 | 0.09 | 0.09 | 0.09 |
| Thickness of bonding layer (mm) | 0.039 | 0.044 | 0.043 | 0.043 | 0.039 | 0.028 | 0.031 |

[Producing Procedure]

Samples (laminated members) of Examples 1 to 14 and 18 to 43 were produced so as to have a combination of members shown in Table 5 to Table 7. Samples of Examples 15 to 17 were prepared.

Examples 1 to 5, 7, 9 to 13, 20 to 24, and 26 to 43 are Working Examples, and Examples 6, 8, 14 to 19, and 25 are Comparative Examples.

First, using SiC abrasive paper, a surface of the glass member shown in Table 1 and Table 2, which was in contact with the resin (bonding layer), was processed into a surface roughness of Ra=0.2 μm. Likewise, using the SiC abrasive paper, a surface of the Si—SiC member shown in Table 3, which was in contact with the resin (bonding layer), was processed into a surface roughness of Ra=0.2 μm.

Next, the resin film shown in Table 4 was sandwiched between the glass member and the Si—SiC member, followed by heating to a temperature of the softening point of the resin film +20° C., and then the laminated object was pressed with a pressure of 2 MPa for 5 minutes, so that the glass member and the Si—SiC member were bonded via the bonding layer. Alternatively, the coating type adhesive shown in Table 4 was applied to the glass member with a thickness of 0.080 mm using a ND type dispenser manufactured by HEISHIN Ltd., and a Si—SiC member is further laminated thereon, and the laminated object was pressurized at a pressure of 1.0 MPa and heated at 120° C. for 4 hours to cure, so that the glass member and the Si—SiC member were bonded via the bonding layer. Accordingly, the samples (laminated members) of Examples 1 to 14 and 18 to 43 were obtained.

[Evaluation of Laminated Member]

The samples were evaluated as follows. Evaluation results are shown in the above Table 5 to Table 7.

(Evaluation of Temperature Rise)

Using nine infrared lamps of 2 kW, the samples of Examples were irradiated with infrared rays (850 nm) for 2 minutes, and the temperature rise was evaluated.

In the case where a temperature of an outermost layer of the sample exceeds 200° C., an evaluation criterion was set to A, and in the case where the temperature of the outermost layer does not exceed 200° C., the evaluation criterion was set to C.

With the samples of Examples 1 to 14 and 18 to 43, which are the laminated members, infrared rays were emitted from a side of a glass member, and the evaluations were performed with the temperature of the outermost layer on the side of the Si—SiC member. With the samples of Examples 15 to 17, the evaluations were performed with a temperature of an outermost layer on a side opposite from an infrared irradiation side.

(Evaluation of Impact Resistance)

A steel ball having a weight of 533 g was dropped onto the respective samples to evaluate the impact resistance. The evaluation of the impact resistance was conducted with three samples (n=3) for each of Examples. A support frame made of a rubber plate having a thickness of 3 mm, a width of 15 mm, and hardness of A50 was attached to an outer peripheral portion of the sample to sandwich and fix the sample from up and down. The steel ball was dropped so as to fall onto an area within a radius of 25 mm from a center of the sample.

With a ball falling height being 20 cm, in the case where two or more samples of the three samples broke, an evaluation criterion was set to C, in the case where one sample of the three samples broke, the evaluation criterion was set to B, and in the case where the three samples did not break, the evaluation criterion was set to A, and B or higher was regarded as a pass.

The steel ball was dropped from the side of the Si—SiC member on the samples of Examples 1 to 14 and 18 to 43, which are the laminated members. Note that the samples of Examples 17 and 25 were not evaluated for the impact resistance.

(Evaluation of Heat Resistance)

A sample of each Example was heated at a temperature of 230° C. for 24 hours and visually evaluated for changes in appearance. In the case where there was no change in appearance (discoloration, foaming, generation of foreign matters, exudation of the bonding layer, and the like), an evaluation criterion was set to A, and in the case where there was a change in appearance, the evaluation criterion was set to C. Note that the sample of Example was not evaluated for the heat resistance.
(Amount of Warpage)

An amount of warpage of the sample of each Example was measured by measuring a three-dimensional texture of a sample surface according to ISO25178-605 using a non-contact three-dimensional shape measuring instrument "NH-5Ns" produced by Mitaka Kohki Co., Ltd. and calculating a maximum inclination-based flatness of a sample surface.

Specifically, with the sample being placed on a precision surface plate, a height of each point of an upper surface of the sample was measured by using a laser autofocus microscope, and a value of a gap formed when the upper surface of the sample was sandwiched by two parallel surfaces, that is, the maximum inclination-based flatness was derived as the amount of warpage.
(Density)

A density of the sample of each Example was obtained by dividing the weight by the volume measured by a digital measure produced by DIGI-TEK Inc.
(Area)

An area of an uppermost surface (a principal surface where a Si—SiC member is exposed in the case of a laminated member, or one of the principal surfaces in the case of a single member) of the sample of each Example was derived from the dimensions measured by the digital measure produced by DIGI-TEK Inc.
(Thickness of Bonding Layer)

Thicknesses of the bonding layers (resin) of the samples of Examples 1 to 14 and 18 to 43 were calculated from the SEM cross-sectional observation.
(Evaluation of Thermal Shock Resistance)

According to a combination same as samples of Examples 1 to 14 and 18 to 43, the laminated member having a width of 15 mm and a length of 100 mm was produced, the side of the Si—SiC member was heated by using a hot plate to give a temperature difference from the glass and the thermal shock resistance was evaluated. Specifically, the surface of the Si—SiC member was heated by using the hot plate set at 220° C., and the side of the glass member was cooled by using a cooling plate cooled to 10° C. with flowing cooling water, and held for 1 hour with the given temperature difference.

In the case where cracks or cloudiness was observed in an adhesive layer by visual observation, an evaluation criterion was set to C, and in the case where there was no change, the evaluation criterion was set to A. Note that the samples of Examples 15 to 17 and Example 25 were not evaluated for the thermal shock resistance.

According to the results in Table 5 to Table 7, it was found that the laminated member of the present invention has a high speed of temperature rise, high impact resistance, and high thermal shock resistance, and is suitable as a heating member (Examples 1 to 5, 7, 9 to 13, 20 to 24, and 26 to 43).

On the other hand, the laminated member of Example 6 had a low average linear expansion coefficient α of less than 2.85 ppm/° C. at 20° C. to 200° C. of the Si—SiC member, and had low thermal shock resistance.

The laminated member of Example 8 had a low average linear expansion coefficient α of less than 2.85 ppm/° C. at 20° C. to 200° C. of the Si—SiC member, and had low impact resistance and low thermal shock resistance.

The laminated member of Example 14 had a high rate of temperature rise, high impact resistance and high thermal shock resistance, but had a large amount of warpage.

The samples of Example 15 to Example 17 had a low rate of temperature rise or low impact resistance.

The laminated members of Examples 18 and 19 had a low average linear expansion coefficient α of less than 2.85 ppm/° C. at 20° C. to 200° C. of the Si—SiC member, and had a low thermal shock resistance.

The laminated member of Example 23 had low impact resistance and a large amount of warpage.

The laminated member of Example 25 had a low rate of temperature rise.

Although various embodiments have been described above with reference to the FIGURE, it is needless to say that the present invention is not limited to such examples. It is apparent to those skilled in the art that various changes and modifications can be conceived within the scope of the claims, and it is also understood that such changes and modifications belong to the technical scope of the present invention. Constituent elements in the embodiments described above may be combined freely within a range not departing from the spirit of the invention.

The present application is based on Japanese Patent Application No. 2021-007287 filed on Jan. 20, 2021, the contents of which are incorporated herein by reference.

REFERENCE SIGNS LIST

100 laminated member
101 glass member
103 bonding layer
105 Si—SiC member

The invention claimed is:
1. A laminated member, comprising:
a glass member having a linear transmittance at a wavelength of 850 nm of 80% or more;
a bonding layer containing a resin and lying on the glass member; and
a Si—SiC member lying on the bonding layer, wherein
the glass member comprises, as represented by mole percent based on oxides, 55.0 mol % to 85.0 mol % of $SiO_2$, 1.5 mol % to 22.0 mol % of $Al_2O_3$, 2.0 mol % to 14.0 mol % of $B_2O_3$, and 0 mol % to 5.0 mol % of $P_2O_5$,
the glass member has a total content of the $SiO_2$, the $Al_2O_3$, the $B_2O_3$, and the $P_2O_5$ of 70.0% to 97.0% as represented by mole percent based on oxides,
the Si—SiC member has an average linear expansion coefficient α at 20° C. to 200° C. of 2.85 ppm/° C. to 4.00 ppm/° C.,
the glass member has an average linear expansion coefficient β at 20° C. to 200° C. of 1.50 ppm/° C. to 5.00 ppm/° C., and
the laminated member has an absolute value |α−β|, which is a value obtained by subtracting the average linear expansion coefficient β of the glass member at 20° C. to 200° C. from the average linear expansion coefficient α of the Si—SiC member at 20° C. to 200° C., of 2.00 ppm/° C. or less.
2. The laminated member according to claim 1, wherein the glass member comprises, as represented by mole percent based on oxides, 60.0 mol % to 78.0 mol % of $SiO_2$, 8.0 mol % to 18.0 mol % of $Al_2O_3$, 2.0 mol % to 11.0 mol % of $B_2O_3$, and 0 mol % to 3.0 mol % of $P_2O_5$, and
the glass member has the total content of the $SiO_2$, the $Al_2O_3$, the $B_2O_3$, and the $P_2O_5$ of 80.0% to 90.0% as represented by mole percent based on oxides.

3. The laminated member according to claim 1, wherein the glass member has a total content of RO and ZnO of 2.0% to 25.0% as represented by mole percent based on oxides, and
the glass member has a total content of $R_2O$ of 0% to 15.0% as represented by mole percent based on oxides.

4. The laminated member according to claim 1, wherein the glass member has an average linear expansion coefficient β of 2.00 ppm/° C. to 3.50 ppm/° C., a Young's modulus of 40 GPa to 120 GPa, and a melting temperature of 1000° C. to 2000° C.

5. The laminated member according to claim 1, wherein the glass member has the content of $B_2O_3$ of 8.5 mol % or less.

6. The laminated member according to claim 1, wherein the glass member comprises, as represented by mole percent based on oxides, 0 mol % to 13.0 mol % of $Na_2O$.

7. The laminated member according to claim 1, wherein the glass member comprises, as represented by mole percent based on oxides, 0.0001 mol % to 0.0115 mol % of $Fe_2O_3$.

8. The laminated member according to claim 1, wherein the glass member has the linear transmittance at a wavelength of 850 nm of 90% or more.

9. The laminated member according to claim 1, wherein the glass member has a thickness of 2 mm to 40 mm, and the Si—SiC member has a thickness of 0.5 mm to 15 mm.

10. The laminated member according to claim 1, wherein the Si—SiC member has a thermal conductivity at 20° C. of 130 W/m·K to 300 W/m·K.

11. The laminated member according to claim 1, wherein the average linear expansion coefficient β of the glass member at 20° C. to 200° C. is smaller than the average linear expansion coefficient α of the Si—SiC member at 20° C. to 200° C.

12. The laminated member according to claim 1, wherein the Si—SiC member has a Young's modulus of 300 GPa to 420 GPa.

13. The laminated member according to claim 1, wherein the Si—SiC member has a metal Si content ratio of 8 mass % to 60 mass %.

14. The laminated member according to claim 1, wherein the resin has a heat resistance temperature of 120° C. to 420° C.

15. The laminated member according to claim 1, wherein the bonding layer has an average linear expansion coefficient γ at 20° C. to 200° C. of 2 ppm/° C. to 200 ppm/° C.

16. The laminated member according to claim 1, having a density of 2.40 g/cm³ to 2.85 g/cm³.

17. The laminated member according to claim 1, having an amount of warpage of 0.25 mm or less.

18. The laminated member according to claim 1, further comprising:
a second bonding layer lying on the Si—SiC member; and
a second Si—SiC member bonded to the Si—SiC member via the second bonding layer.

19. A glass composition used for a glass member in a laminated member, the laminated member comprising the glass member, a bonding layer containing a resin and lying on the glass member, and a Si—SiC member lying on the bonding layer, wherein
the glass composition has a linear transmittance at a wavelength of 850 nm of 80% or more,
the glass composition comprises, as represented by mole percent based on oxides, 55.0 mol % to 85.0 mol % of $SiO_2$, 1.5 mol % to 22.0 mol % of $Al_2O_3$, 2.0 mol % to 14.0 mol % of $B_2O_3$, and 0 mol % to 5.0 mol % of $P_2O_5$,
the glass composition has a total content of the $SiO_2$, the $Al_2O_3$, the $B_2O_3$, and the $P_2O_5$ of 70.0% to 97.0% as represented by mole percent based on oxides,
the glass composition has an average linear expansion coefficient β at 20° C. to 200° C. of 1.50 ppm/° C. to 5.00 ppm/° C.,
the glass composition is used for a laminated member comprising a Si—SiC member having an average linear expansion coefficient α at 20° C. to 200° C. of 2.85 ppm/° C. to 4.00 ppm/° C. so that the laminated member has an absolute value |α−β|, which is a value obtained by subtracting the average linear expansion coefficient β of the glass member at 20° C. to 200° C. from the average linear expansion coefficient α of the Si—SiC member at 20° C. to 200° C., of 2.00 ppm/° C. or less.

* * * * *